(12) United States Patent
Tsuchiya

(10) Patent No.: US 9,235,421 B2
(45) Date of Patent: Jan. 12, 2016

(54) SYSTEMS, METHODS, AND NON-TRANSITORY, COMPUTER-READABLE MEDIA FOR PERFORMING IMAGE PROCESSING USING CONTROLLERS THAT PERFORM DISTINCT FUNCTIONS

(71) Applicant: Brother Kogyo Kabushiki Kaisha, Nagoya-shi, Aichi-ken (JP)

(72) Inventor: Taisuke Tsuchiya, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 606 days.

(21) Appl. No.: 13/629,340

(22) Filed: Sep. 27, 2012

(65) Prior Publication Data
US 2013/0258376 A1 Oct. 3, 2013

(30) Foreign Application Priority Data
Mar. 30, 2012 (JP) ................................. 2012-082731

(51) Int. Cl.
G06F 9/38 (2006.01)
G03G 15/00 (2006.01)

(52) U.S. Cl.
CPC .......... *G06F 9/3877* (2013.01); *G03G 15/5025* (2013.01)

(58) Field of Classification Search
None
See application file for complete search history.

(56) References Cited

U.S. PATENT DOCUMENTS

| 5,630,170 A | 5/1997 | Koizumi et al. |
| 5,872,999 A | 2/1999 | Koizumi et al. |
| 5,892,974 A | 4/1999 | Koizumi et al. |
| 2009/0190178 A1* | 7/2009 | Saito .................... H04N 1/0473 358/1.16 |

FOREIGN PATENT DOCUMENTS

| JP | H06-004457 A | 1/1994 |
| JP | H09-512369 A | 12/1997 |
| JP | 2000-198240 A | 7/2000 |
| JP | 2004-104735 A | 4/2004 |
| JP | 2006-259966 A | 9/2006 |
| JP | 2006-276949 A | 10/2006 |
| JP | 2006-295610 A | 10/2006 |
| JP | 2009-026165 A | 2/2009 |
| JP | 2011-178069 A | 9/2011 |

\* cited by examiner

*Primary Examiner* — Justin Seo
(74) *Attorney, Agent, or Firm* — Baker Botts L.L.P.

(57) ABSTRACT

An image recording apparatus includes a first controller, a second controller, and a recording device. The first controller receives image data. The first controller transmits the image data to the second controller in response to receiving the image data. The second controller generates driving data based on the image data in response to receiving the image data. The recording device transmits a driving data transmission request to the first controller. The first controller transmits a driving data transmission instruction to the second controller in response to receiving the driving data transmission request from the recording device. The second controller transmits the driving data to the recording device in response to receiving the driving data transmission instruction from the first controller. The recording device records the image on the recording medium based on the driving data in response to receiving the driving data from the second controller.

11 Claims, 15 Drawing Sheets

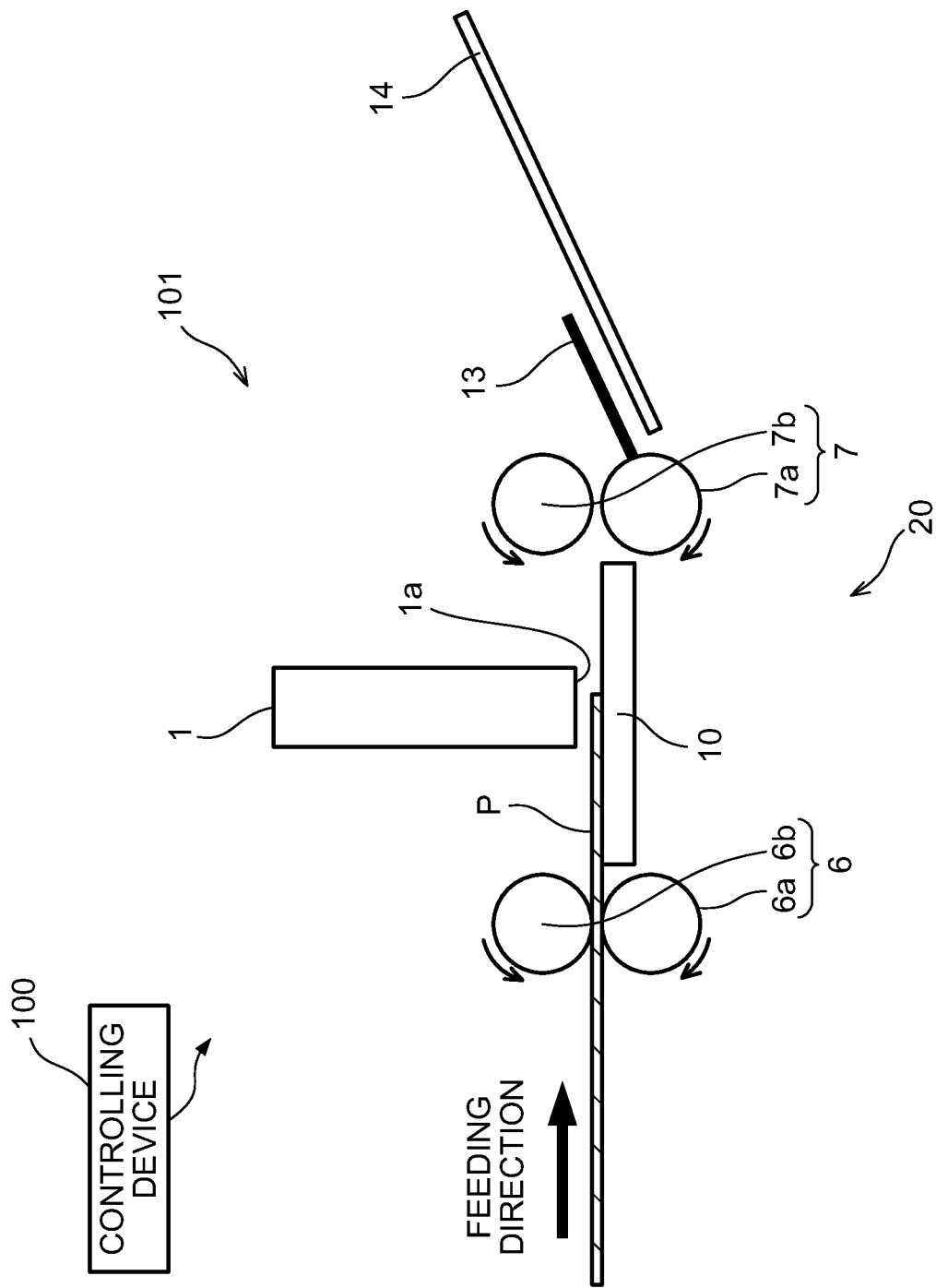

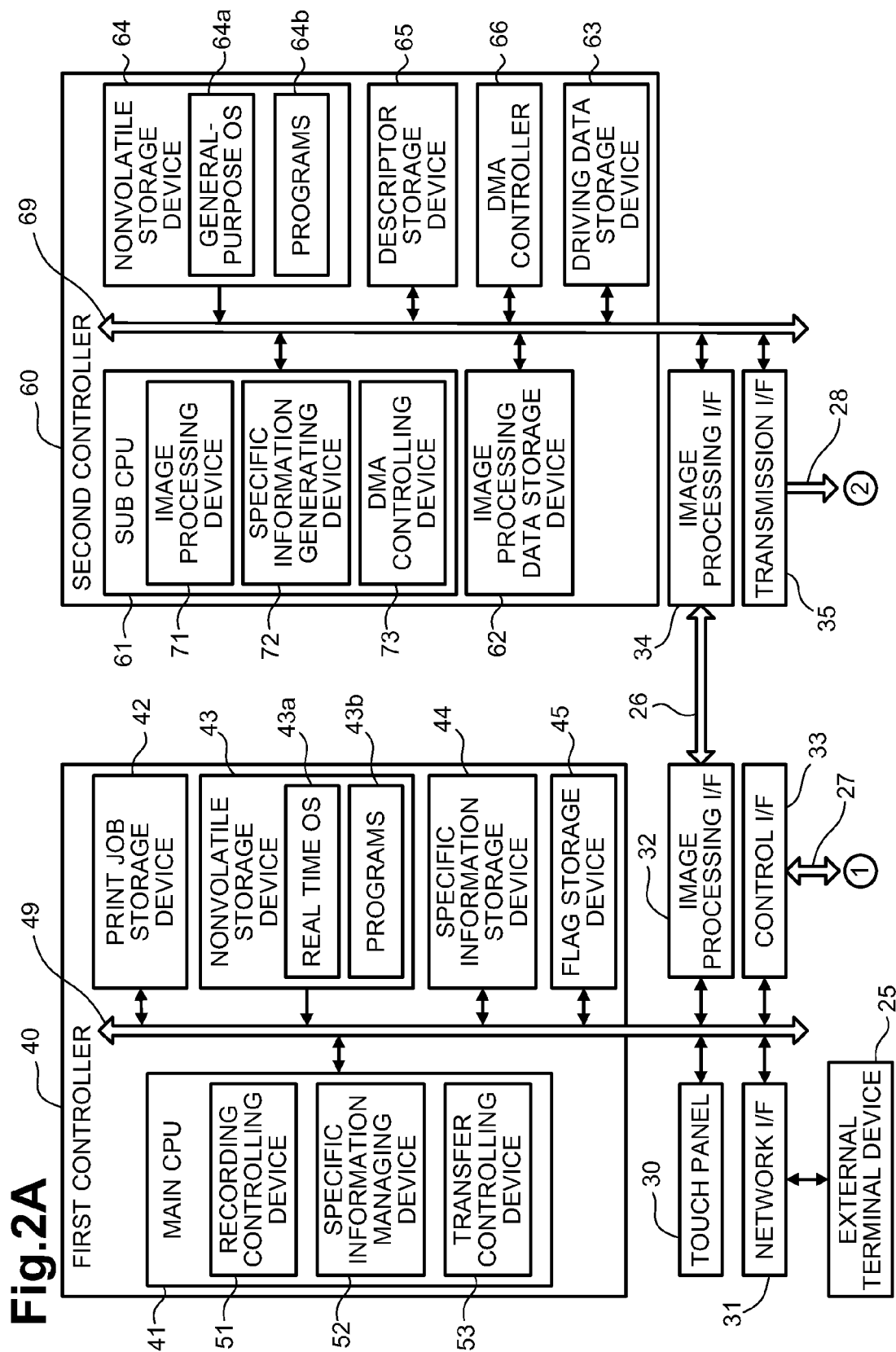

Fig.3A PRINT JOB

| PRINT JOB NAME | SETTING DATA | | | IMAGE DATA | IMAGE DATA | ... | IMAGE DATA |
|---|---|---|---|---|---|---|---|
| | PRINT MODE | QUALITY MODE | TOTAL NUMBER OF PAGES | | | | |

Fig.3B DRIVING DATA RELATED INFORMATION

| SPECIFIC INFORMATION | | DRIVING DATA ATTRIBUTE INFORMATION | |
|---|---|---|---|
| BEGINNING ADDRESS | END ADDRESS | IMAGE DATA ATTRIBUTE INFORMATION | DRIVING DATA SIZE |

Fig.3C IMAGE PROCESSING DATA

| IMAGE DATA | IMAGE DATA ATTRIBUTE INFORMATION | PRINT JOB NAME | PRINT MODE | QUALITY MODE | TOTAL NUMBER OF PAGES | IMAGE DATA | IMAGE DATA ATTRIBUTE INFORMATION | ... |
|---|---|---|---|---|---|---|---|---|
| PAGE NUMBER | | | | | | | PAGE NUMBER / PRINT JOB NAME | |

Fig.3D PRINT INSTRUCTION

| CONTROL DATA | |
|---|---|
| QUALITY MODE | TOTAL NUMBER OF PAGES |

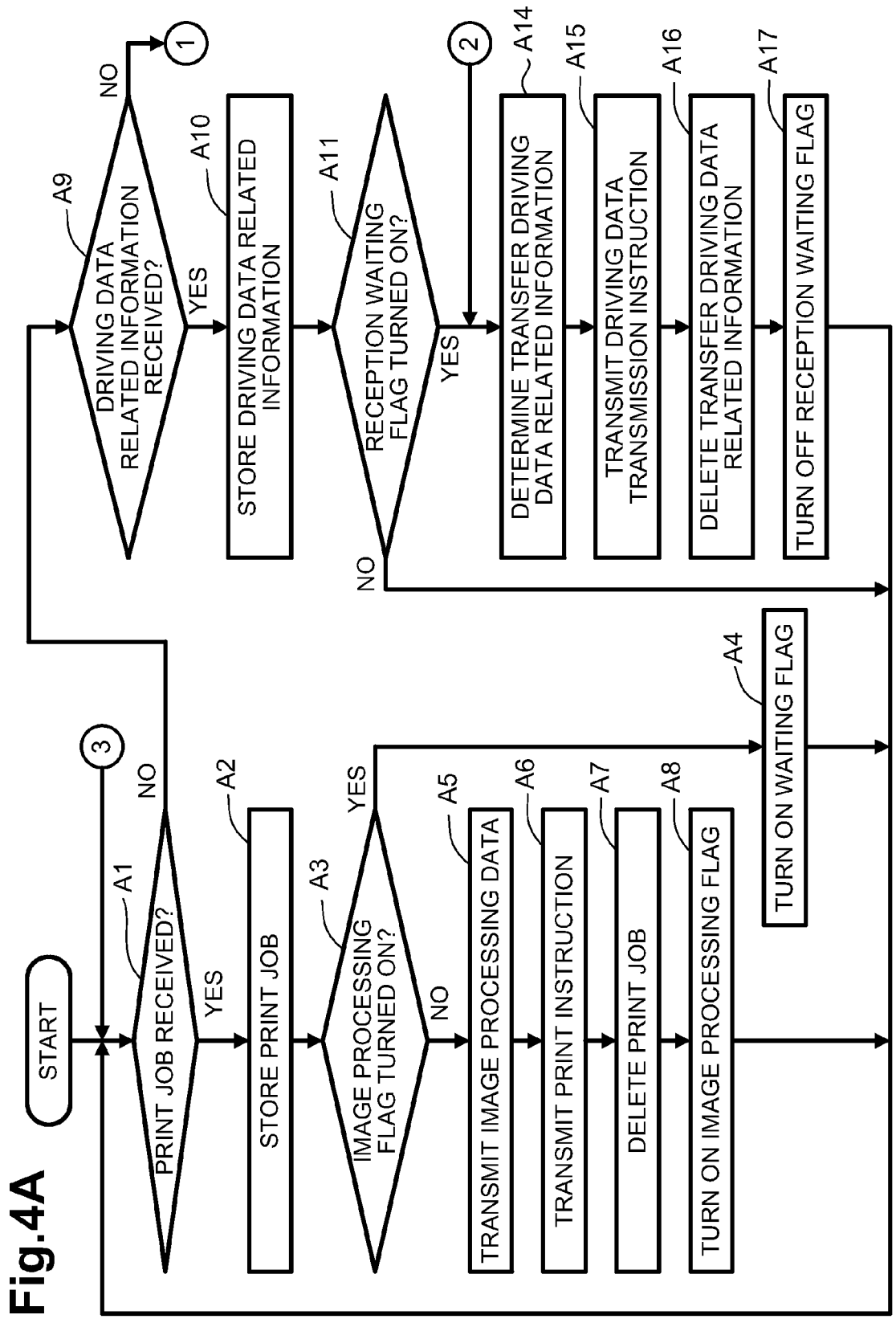

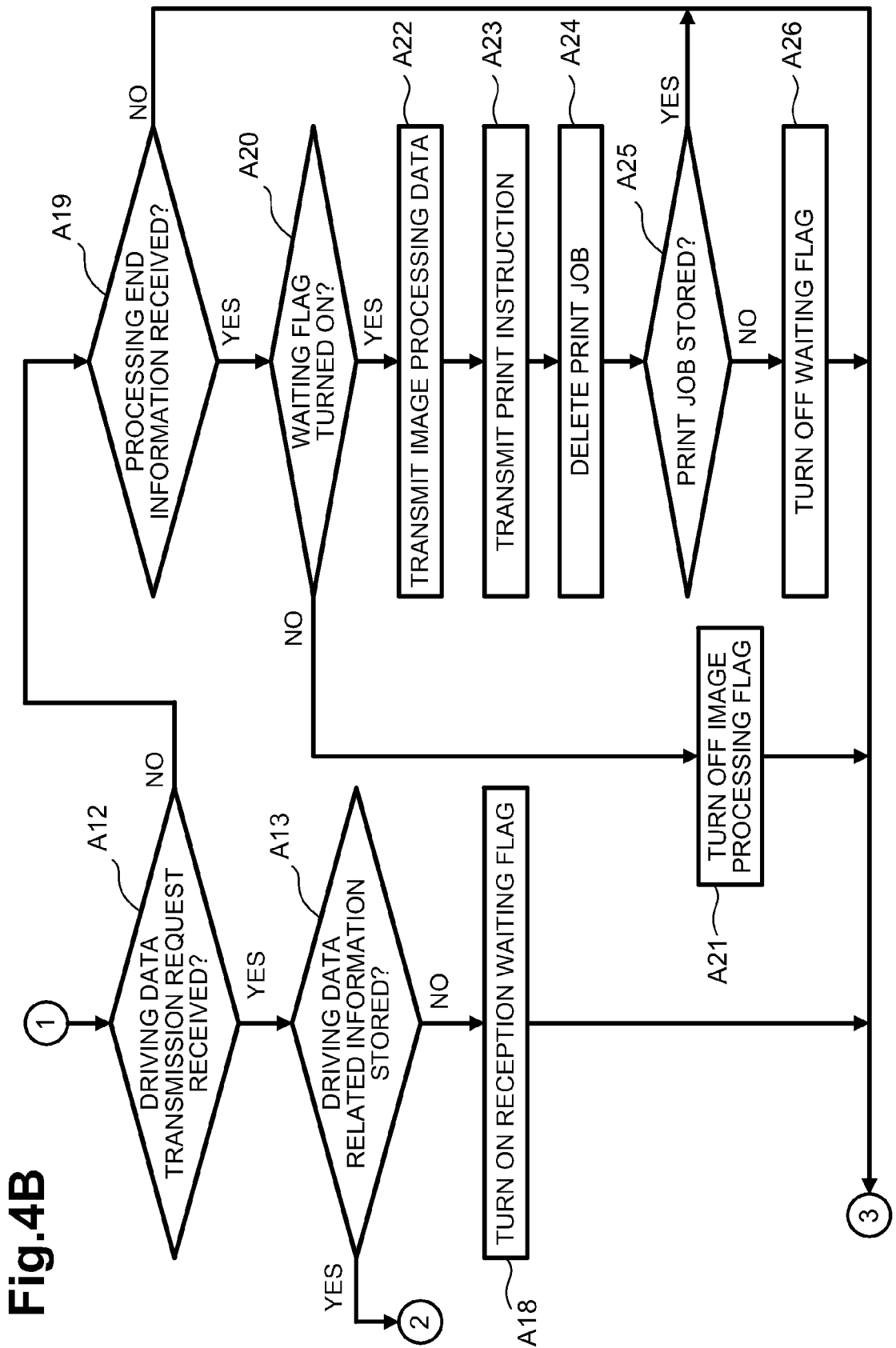

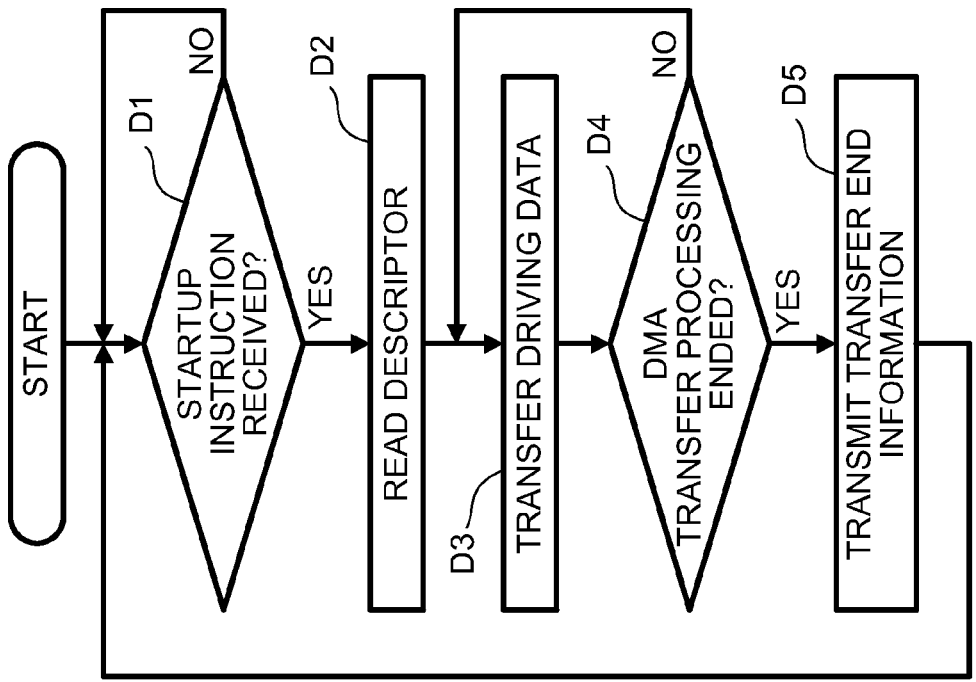
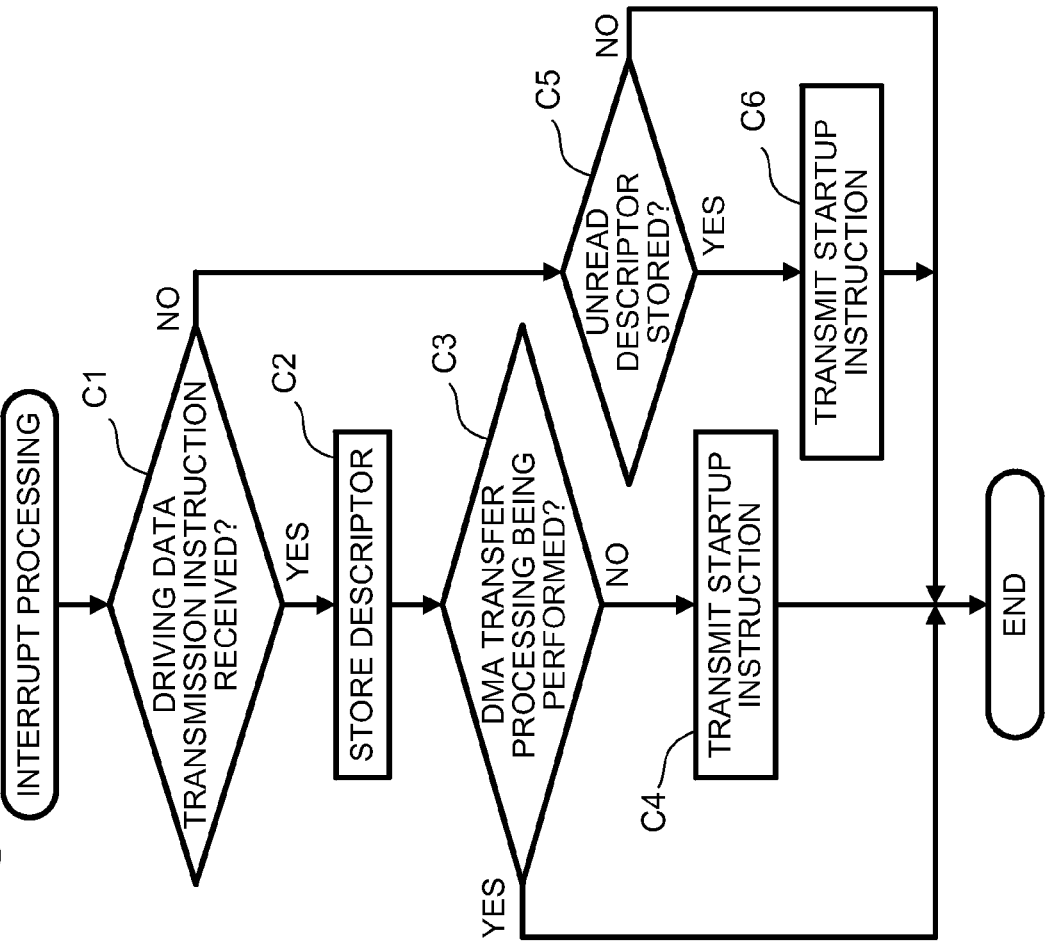

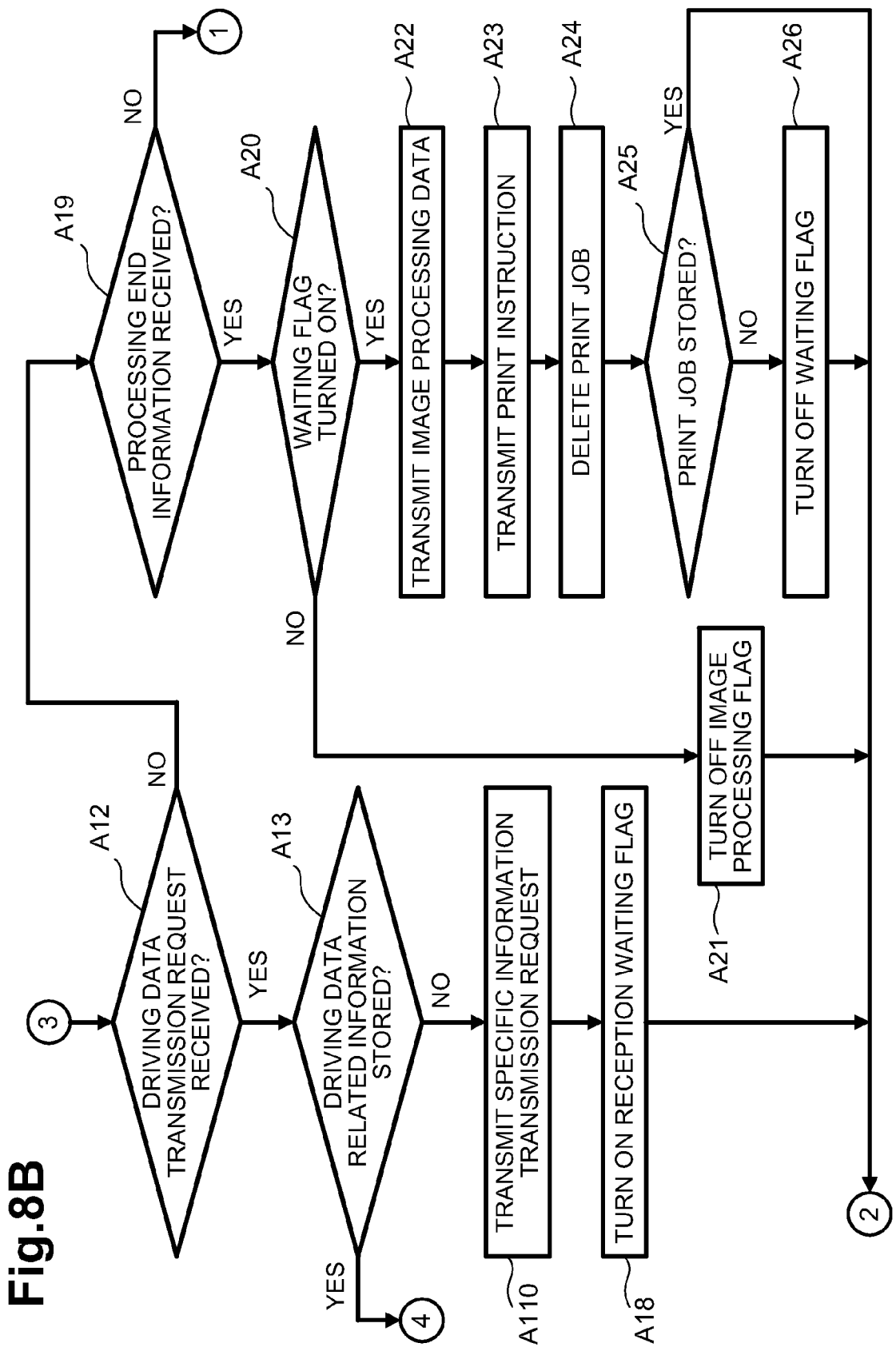

SYSTEMS, METHODS, AND NON-TRANSITORY, COMPUTER-READABLE MEDIA FOR PERFORMING IMAGE PROCESSING USING CONTROLLERS THAT PERFORM DISTINCT FUNCTIONS

CROSS REFERENCE TO RELATED APPLICATION

This application claims priority to Japanese Patent Application No 2012-082731 filed on Mar. 30, 2012, the disclosure of which is incorporated herein by reference.

BACKGROUND OF THE INVENTION

1. Field of the Invention

The present invention relates generally to image processing and more specifically to systems, methods, and non-transitory, computer-readable media for performing image processing using controllers that perform distinct functions.

2. Description of Related Art

A known image recording apparatus performs parallel processing to increase an image recording speed.

A known printing device includes a printing mechanism, a first control section, and a second control section. The first control section performs image processing that converts print data transmitted from an external device into intermediate codes. The second control section performs image processing that converts the intermediate codes received from the first control section into binary data that is output to the printing mechanism and processing that controls the output of the binary data to the printing mechanism.

Complicated and high-speed processing is often required for image processing by image recording apparatuses. A controlling device (i.e., a first control section) for performing image processing requires relatively expensive components, such as a central processing device and an arithmetic circuit. Costs of components used in the controlling device increase as the processing speed of the controlling device increases. As loads applied to the controlling device by processing that is not the image processing increases, resources of the controlling device are not available for image processing. To realize the required image processing, more expensive components are required in the controlling device, which leads to increases in costs associated with the image recording apparatuses.

SUMMARY OF THE INVENTION

Image recording apparatuses described herein may overcome one or more of these and other shortcomings of the related art. In certain configurations, the image recording apparatuses disclosed herein may reduce costs of image recording apparatus associated by reducing an amount of processing performed by a controller configured to perform image processing that is not the image processing.

An image recording apparatus disclosed herein may comprise a first controller, a second controller, and a recording device. The first controller may be configured to receive image data. The first controller may comprise a first memory. The second controller may be configured to communicate with the first controller. The second controller may comprise a second memory. The recording device may be configured to communicate with the first controller and the second controller. The recording device may be further configured to record on a recording medium an image defined by the image data. The first controller may be further configured to transmit the image data to the second controller. The second controller may be configured to receive the image data transmitted by the first controller. The second controller may be configured to generate driving data comprising instructions for the recording device to record the image defined by the image data. The second controller may be configured to store the driving data in the second memory. The second controller may be configured to generate specific information specifying a storage location of the driving data stored in the second memory. The second controller may be configured to transmit the specific information to the first controller. The recording device may be configured to transmit a driving data transmission request to the first controller. The driving data transmission request may comprise a request for the second controller to transmit the driving data to the recording device. The first controller may be configured to receive the specific information transmitted by the second controller. The first controller may be configured to store the specific information in the first memory. The first controller may be configured to generate a driving data transmission instruction based on the specific information stored in the first memory when the first controller receives the driving data transmission request. The driving data transmission instruction may comprise an instruction for the second controller to transmit the driving data, which is specified by the specific information and is stored in the second memory, to the recording device. The first controller may be configured to transmit the driving data transmission instruction to the second controller. The second controller may be configured to receive the driving data transmission instruction transmitted by the first controller. The second controller may be configured to transmit the driving data, which is stored in the second memory and is specified by the driving data transmission instruction received from the first controller, to the recording device.

Another image recording apparatus disclosed herein may comprise a first controller, a second controller, a recording device, a third memory, and a data transmitting device. The first controller may be configured to receive image data. The first controller may comprise a first memory. The second controller may be configured to communicate with the first controller. The second controller may comprise a second memory. The recording device may be configured to communicate with the first controller. The recording device may be further configured to record on a recording medium an image defined by the image data. The third memory may be configured to communicate with the first controller. The third memory may be further configured to store specific information specifying a storage location of particular data stored in the second memory. The data transmitting device may be configured to communicate with the recording device, the second memory, and the third memory. The data transmitting device may be further configured to transmit the particular data based on the specific information stored in the third memory. The particular data may be stored in the storage location specified by the specific information. The first controller may be further configured to transmit the image data to the second controller. The second controller may be configured to receive the image data transmitted by the first controller. The second controller may be configured to generate driving data comprising instructions for the recording device to record the image defined by the image data. The second controller may be configured to store the driving data in the second memory. The second controller may be configured to generate specific information specifying a storage location of the driving data stored in the second memory. The second controller may be configured to transmit the specific information to the first controller. The first controller may be configured to receive the specific information transmitted by the second controller and store the specific information in the first memory. The recording device may be configured to transmit a driving data transmission request to the first controller. The driving data transmission request may comprise a request for the second controller to transmit the driving data to the recording device. The first controller may be configured to store the specific information in the third memory when the first controller receives the driving data transmission request transmitted by the recording device. The transmitting device may be configured to transmit the driving data, which is stored in the second memory and is specified by the specific information stored in the third memory, to the recording device.

A method for performing image recording on an image recording apparatus disclosed herein may comprise performing certain processes. The image recording apparatus may comprise a first controller configured to receive image data. The first controller may comprise a first memory. The image recording apparatus may comprise a second controller configured to communicate with the first controller. The second controller may comprise a second memory. The image recording apparatus may comprise a recording device configured to communicate with the first controller and the second controller. The recording device may be further configured to record on a recording medium an image defined by the image data. The method for performing image recording on the image recording apparatus may comprise a process of transmitting the image data from the first controller to the second controller. The method for performing image recording on the image recording apparatus may comprise a process of generating at the second controller driving data comprising instructions for the recording device to record the image defined by the image data. The method for performing image recording on the image recording apparatus may comprise a process of storing the driving data in the second memory. The method for performing image recording on the image recording apparatus may comprise a process of generating at the second controller specific information specifying a storage location of the driving data stored in the second memory. The method for performing image recording on the image recording apparatus may comprise a process of transmitting the specific information from the second controller to the first controller. The method for performing image recording on the image recording apparatus may comprise a process of storing the specific information in the first memory. The method for performing image recording on the image recording apparatus may comprise a process of transmitting a driving data transmission request from the recording device to the first controller. The driving data transmission request may comprise a request for the second controller to transmit the driving data from the second controller to the recording device. The method for performing image recording on the image recording apparatus may comprise a process of generating a driving data transmission instruction based on the specific information stored in the first memory when the first controller receives the driving data transmission request. The driving data transmission instruction may comprise an instruction for the second controller to transmit the driving data, which is specified by the specific information and stored in the second memory, to the recording device. The method for performing image recording on the image recording apparatus may comprise a process of transmitting the driving data transmission instruction from the first controller to the second controller. The method for performing image recording on the image recording apparatus may comprise a process of transmitting the driving data, which is stored in the second memory and is specified by the driving data transmission instruction received from the first controller, from the second controller to the recording device.

A non-transitory, computer-readable storage medium disclosed herein may store computer-readable instructions therein that, when executed by at least one processor of an image recording apparatus, may instruct the image forming apparatus to execute certain processes. The image recording apparatus may comprise a first controller configured to receive image data. The first controller may comprise a first memory. The image recording apparatus may comprise a second controller configured to communicate with the first controller. The second controller may comprise a second memory. The image recording apparatus may comprise a recording device configured to communicate with the first controller and the second controller. The recording device may be further configured to record on a recording medium an image defined by the image data. The computer-readable instructions may instruct the image forming apparatus to execute a process of transmitting the image data from the first controller to the second controller. The computer-readable instructions may instruct the image forming apparatus to execute a process of generating at the second controller driving data comprising instructions for the recording device to record the image defined by the image data. The computer-readable instructions may instruct the image forming apparatus to execute a process of storing the driving data in the second memory. The computer-readable instructions may instruct the image forming apparatus to execute a process of generating at the second controller specific information specifying a storage location of the driving data stored in the second memory. The computer-readable instructions may instruct the image forming apparatus to execute a process of transmitting the specific information from the second controller to the first controller. The computer-readable instructions may instruct the image forming apparatus to execute a process of storing the specific information in the first memory. The computer-readable instructions may instruct the image forming apparatus to execute a process of transmitting a driving data transmission request from the recording device to the first controller. The driving data transmission request may comprise a request for the second controller to transmit the driving data from the second controller to the recording device. The computer-readable instructions may instruct the image forming apparatus to execute a process of generating a driving data transmission instruction based on the specific information stored in the first memory when the first controller receives the driving data transmission request. The driving data transmission instruction may comprise an instruction for the second controller to transmit the driving data, which is specified by the specific information and stored in the second memory, to the recording device. The computer-readable instructions may instruct the image forming apparatus to execute a process of transmitting the driving data transmission instruction from the first controller to the second controller. The computer-readable instructions may instruct the image forming apparatus to execute a process of transmitting the driving data, which is stored in the second memory and is specified by the driving data transmission instruction received from the first controller, from the second controller to the recording device.

Still another image recording apparatus disclosed herein may comprise a first controller, a second controller, and a recording device. The first controller may be configured to receive image data. The second controller may be configured to generate driving data based on the image data. The recording device may be configured to record an image on a recording medium based on the driving data. The first controller may be configured to transmit the image data to the second controller in response to receiving the image data. The second controller may be configured to generate the driving data in response to receiving the image data. The recording device may be configured to transmit a driving data transmission request to the first controller in response to finishing recording another image. The first controller may be configured to transmit a driving data transmission instruction to the second controller in response to receiving the driving data transmission request from the recording device. The second controller may be configured to transmit the driving data to the recording device in response to receiving the driving data transmission instruction from the first controller. The recording device may be configured to record the image on the recording medium in response to receiving the driving data from the second controller.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 1 is a side view that shows a schematic illustration of an inkjet printer in embodiments according to one or more aspects of the invention.

FIG. 2A is a diagrammatic view that shows components of the inkjet printer of FIG. 1.

FIG. 3A is a diagrammatic view that shows a data structure of a print job; FIG. 3B is a diagrammatic view that shows a data structure of driving data related information; FIG. 3C is a diagrammatic view that shows a data structure of image processing data; and FIG. 3D is a diagrammatic view that shows a data structure of print instruction.

FIG. 4A is a flow sheet that shows a portion of a process that may be performed by the first controller of FIG. 2; and FIG. 4B is a flow sheet that shows another portion of the process that may be performed by the first controller of FIG. 2.

FIG. 5B is a flow sheet that shows an interrupt processing process that may be performed by the second controller of FIG. 2; and FIG. 5C is a flow sheet that shows a process performed by the DMA controller of FIG. 2.

FIG. 8B is a flow sheet that shows another portion of the process that may be performed by the first controller of FIG. 7.

DETAILED DESCRIPTION OF EMBODIMENTS OF THE INVENTION

Figure 2B:
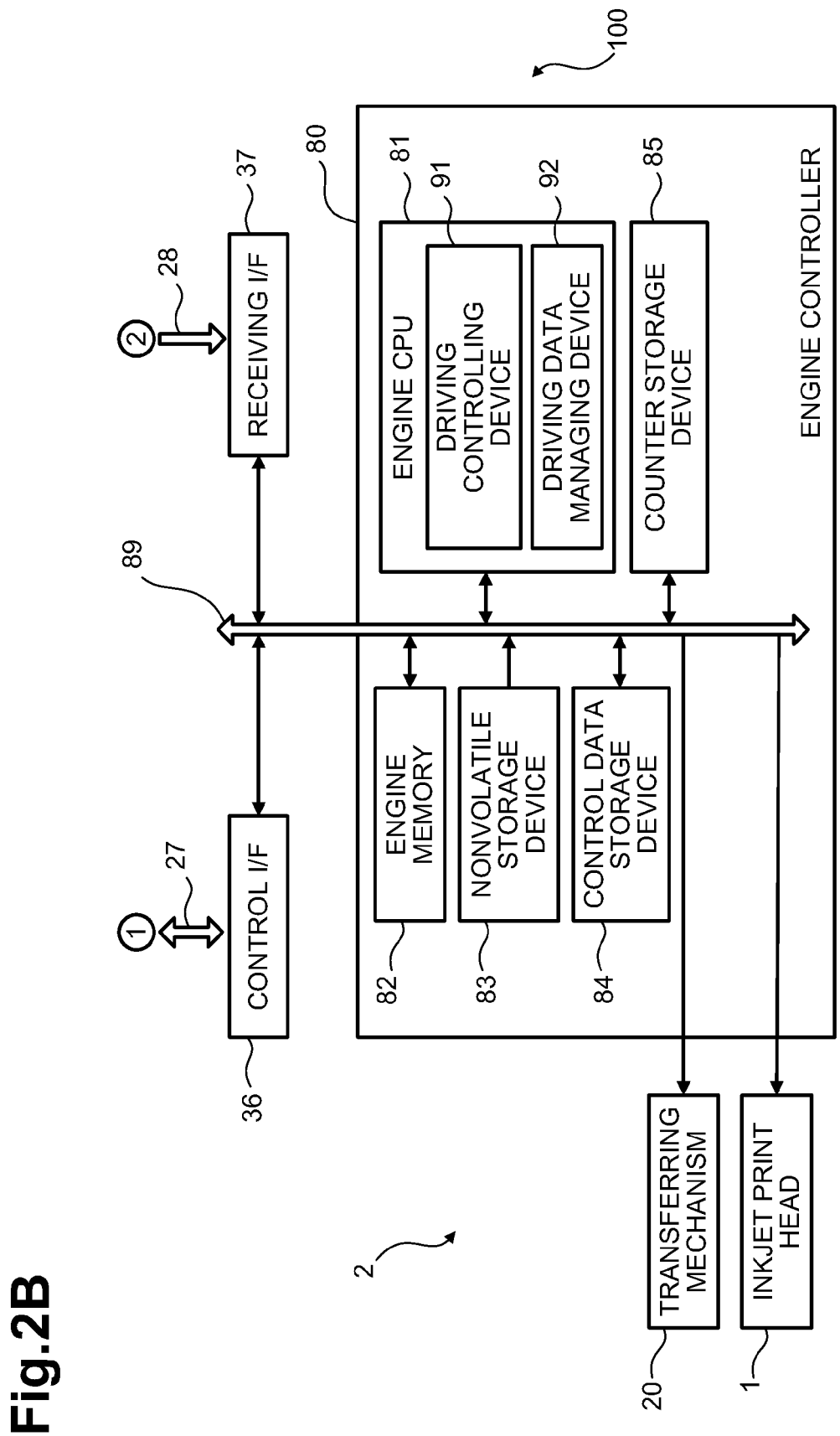
FIG. 2B is a diagrammatic view that shows other components of the inkjet printer of FIG. 1.

Embodiments now are described in detail with reference to the accompanying drawings, wherein similar reference numerals may correspond to similar components throughout the various drawings.

An image recording apparatus according to the present invention may comprise an inkjet printer 101.

As shown in FIG. 1, the inkjet printer 101 may comprise a transferring mechanism 20 configured to transfer a recording medium (e.g., a sheet P), an inkjet print head 1 configured to eject ink (e.g., black ink, ink of other colors) onto the sheet P transferred by the transferring mechanism 20, and a controlling device 100 configured to control the inkjet printer 101.

The transferring mechanism 20 may be configured to transfer the sheet P in a feeding direction (e.g., from the left to right in FIG. 1). The transferring mechanism 20 may comprise a first transferring section 6, a second transferring section 7, a platen 10, a separation plate 13, and an output tray 14.

The first transferring section 6 may comprise a pair of transfer rollers 6a, 6b, and a driving motor (not shown) that may be configured to rotate the transfer rollers 6a, 6b. The driving motor may be configured to rotate the transfer rollers 6a, 6b in a direction opposite to each other, as shown by arrows in FIG. 1. The transfer rollers 6a, 6b may be configured to feed the sheet P supplied by a sheet feeding mechanism (not shown) in the feeding direction while holding the sheet P between the transfer rollers 6a, 6b.

The second transferring section 7 may comprise a pair of transfer roller 7a, 7b, and a driving motor that may be configured to rotate the transfer rollers 7a, 7b. The driving motor may be configured to rotate the transfer rollers 7a, 7b in a direction opposite to each other, as shown by arrows in FIG. 1. The transfer rollers 7a, 7b may be configured to receive the sheet P transferred by the first transferring section 6 and feed the sheet P in the feeding direction while holding the sheet P between the transfer rollers 7a, 7b.

The inkjet print head 1 may extend in a direction substantially perpendicular to the feeding direction of the sheet P. The inkjet print head 1 may be disposed between the first transferring section 6 and the second transferring section 7 in the feeding direction. A lower surface of the inkjet print head 1 may comprise an ejecting surface 1a having ejection holes from which ink may be ejected. Accordingly, the inkjet printer 101 may be a line inkjet printer. The inkjet print head 1 may be configured to eject ink droplets (e.g., droplets of black ink, droplets of other colors of ink) from the ejection holes when the sheet P being transferred by the transferring mechanism 20 passes directly below the inkjet print head 1. Thus, an image may be recorded onto the sheet P (e.g., a black-and-white image, a colored-and-white image).

The platen 10 may be disposed between the first transferring section 6 and the second transferring section 7 in the feeding direction. The platen 10 may be positioned opposite to the ejecting surface 1a of the inkjet print head 1. The platen 10 may be configured to support the sheet P being transferred by the first transferring section 6 and the second transferring section 7 from below. A predetermined space suitable for an image forming may be provided between an upper surface of the platen 10 and the ejecting surface 1a of the inkjet print head 1.

The separation plate 13 may be disposed downstream of the second transferring section 7 in the feeding direction. The separation plate 13 may be configured to separate the sheet P from an outer peripheral surface of the transfer roller 7a, 7b. The sheet P separated from the outer peripheral surface of the transfer roller 7a, 7b by the separation plate 13 may be placed on the output tray 14.

The inkjet printer 101 may be configured to perform double-sided printing in which an image is recorded on each side of the sheet P. When double-sided printing is performed, image data of odd-numbered pages of a print job may be printed sequentially on one side of each sheet P. Thereafter, the each sheet P may be output onto the output tray 14. After printing of the odd-numbered pages of the print job is finished, the sheets P output onto the output tray 14 may be set to the sheet feeding mechanism with the other side of the sheets P as a printing surface. Subsequently, image data of even-numbered pages of the print job may be printed sequentially.

Components of the controlling device 100 now are described with reference to FIGS. 2A and 2B. The controlling device 100 may comprise one or more of a first controller 40, a second controller 60, and an engine controller 80. The first controller 40 may be configured to control overall operations of the inkjet printer 101. The second controller 60 may be configured to perform image processing, in which image data of an image to be printed on a sheet P may be converted into driving data for driving the inkjet print head 1. The engine controller 80 may be configured to control the inkjet print head 1, the transferring mechanism 20, and the sheet feeding mechanism to perform printing for recording an image on the sheet P. A recording device 2 may comprise the engine controller 80, the inkjet print head 1, the transferring mechanism 20 and the sheet feeding mechanism (not shown).

The first controller 40 may comprise a main central processing unit ("CPU") 41, a print job storage device 42, a nonvolatile storage device 43, a first storage device (e.g., a specific information storage device 44), and a flag storage device 45. The main CPU 41, the print job storage device 42, the nonvolatile storage device 43, the specific information storage device 44, and the flag storage device 45 may be interconnected, via a bus 49, to communicate with each other.

The first controller 40 may be connected to a touch panel 30, a receiver (e.g., a network interface ("I/F") 31), an image processing I/F 32, and a control I/F 33, via the bus 49.

The touch panel 30 may be configured to accept various inputs. Further, the touch panel 30 may be configured to display various setting screens and operating conditions.

The network I/F 31 may be connected to an external device (e.g., an external terminal device 25), via a local area network ("LAN"), which may allow communication between the network I/F 31 and the external terminal device 25. The network I/F 31 may be configured to receive a print job from the external terminal device 25 and to transmit the print job to the first controller 40. As shown in FIG. 3A, the print job may comprise setting data and one or more pieces of image data of an image to be printed on the sheet P. The setting data may comprise data relating to print settings. The setting data may comprise information of a print job name, a print mode, a quality mode, and a total number of pages of a print job (e.g., total pieces of image data). The print mode may comprise one or more of a double-sided printing mode, in which printing may be performed on each side of the sheet P, and a normal printing mode, in which printing may be performed on one side of the sheet P. The quality mode may comprise one or more of a normal quality mode and a high quality mode, in which an image may be printed on the sheet P in greater quality than the quality used in the normal quality mode. One piece of image data may correspond to data of one page of the sheet P.

The image processing I/F 32 may be connected to the second controller 60, via a serial bus 26 which may allow bi-directional data communication. The control I/F 33 may be connected to the engine controller 80, via a serial bus 27, which may allow bi-directional data communication. Thus, bi-directional data communication may occur between the first controller 40 and the second controller 60 and between the first controller 40 and the engine controller 80.

The main CPU 41 may comprise a general-purpose CPU (e.g., a processor) configured to perform calculations and to control overall operations of the inkjet printer 101. The print job storage device 42 may be configured to store a print job received from the external terminal device 25, via the network I/F 31.

The nonvolatile storage device 43 may store a real time operating system 43a and various programs 43b (e.g., computer-readable instructions). The computer-readable instructions stored in the nonvolatile storage device 43 may instruct the main CPU 41 to operate as one or more of a recording controlling device 51, a specific information managing device 52, and a transfer controlling device 53, in cooperation with other computer-readable instructions in the nonvolatile storage device 43.

The specific information storage device 44 may be configured to store driving data related information received from the second controller 60, via the image processing I/F 32. As shown in FIG. 3B, the driving data related information may be data comprising specific information, which may specify a storage location of driving data stored in a driving data storage device 63 of the second controller 60, and driving data attribute information, which may specify information corresponding to the driving data. The specific information may comprise address information comprising a beginning address and an ending address of the storage location of driving data stored in the driving data storage device 63. The driving data attribute information may comprise image data attribute information (described below) for image data corresponding to the driving data and a size of the driving data.

The flag storage device 45 may be configured to store an image processing flag indicating whether the second controller 60 is performing image processing, a waiting flag indicating whether a print job is stored in the print job storage device 42, and a reception waiting flag indicating whether the first controller 40 is waiting for reception of the specific information from the second controller 60. The image processing flag may indicate that the second controller 60 is performing the image processing when the image processing flag is in an on state. The image processing flag may indicate that the second controller 60 is not performing the image processing when the image processing flag is in an off state. The waiting flag may indicate a print job is stored in the print job storage device 42 when the waiting flag is in an on state. The waiting flag may indicate a print job is not stored in the print job storage device 42 when the waiting flag is in an oil state. The reception waiting flag may indicate that the first controller 40 is waiting for the reception of the driving data related information (e.g., specific information) from the second controller 60 when the reception waiting flag is in an on state. The reception waiting flag may indicate that the first controller 40 is not waiting for the reception of the driving data related information (e.g., specific information) from the second controller 60 when the reception waiting flag is in an off state. The image processing flag, the waiting flag, and the reception waiting flag initially may be set to the off state.

Functions of the main CPU 41 operating as one or more of the recording controlling device 51, the specific information managing device 52, and the transfer controlling device 53 in cooperation with the computer-readable instructions stored in the nonvolatile storage device 43 are described in detail below.

The recording controlling device 51 may be configured to store a print job in the print job storage device 42 when the network I/F 31 has received a print job from the external terminal device 25. The recording controlling device 51 may be configured to transmit image processing data to the second controller 60, via the image processing I/F 32. As shown in FIG. 3C, the image processing data may comprise pieces of image data contained in a print job (e.g., all pieces of image data contained in the print job or a portion thereof) and image data attribute information corresponding to each piece of the image data. The image data attribute information may comprise information (e.g., data) about the page number of each piece of the image data of the print job (e.g., the page number itself) and information about the name of the print job (e.g., the name of the print job itself). The image data attribute information of the first piece of the image data in the image processing data may further comprise, for example, information about one or more of the print mode, the quality mode, and the total number of pages in the print job, as well as the page number and the print job name.

The recording controlling device 51 may perform data communication with the engine controller 80, via the control I/F 33. For example, the recording controlling device 51 may be configured to transmit a print instruction, which may comprise data that may instruct the inkjet printer 101 to start printing a print job, to the engine controller 80. As shown in FIG. 3D, the print instruction may comprise control data comprising information about the quality mode and about the total number of pages of the print job contained in the setting data of the print job.

The specific information managing device 52 may be configured to store the driving data related information (shown in FIG. 3B) in the specific information storage device 44 when the driving data related information is received from the second controller 60, via the image processing I/F 32. The specific information managing device 52 may be configured to access the driving data related information stored in the specific information storage device 44, which the specific information managing device 52 may use to determine the driving data related information of the driving data subsequently to be transmitted to the engine controller 80 from among one or more pieces of the driving data stored in the driving data storage device 63. The driving data related information of the driving data to be transmitted next to the engine controller 80 from the driving data storage device 63 may referred to as the "transfer driving data related information." For example, when the print mode of a print job is a double-sided printing mode, the driving data related information may be determined such that the driving data of odd-numbered pages may be transferred sequentially from the second controller 60 to the engine controller 80. After the printing of the driving data of the odd-numbered pages is completed, the driving data related information may be determined such that the driving data of even-numbered pages may be transferred sequentially from the second controller 60 to the engine controller 80.

The transfer controlling device 53 may be configured to transmit a driving data transmission instruction to the second controller 60, via the image processing I/F 32. The driving data transmission instruction may comprise data instructing the second controller to transmit the driving data, which is specified by the specific information contained in the transfer driving data related information and stored in the driving data storage device 63 of the second controller 60, to the engine controller 80.

As described above, the first controller 40 may comprise the real time operating system 43a, so that overall operations of the inkjet printer 101 may be controlled in real time.

The second controller 60 may comprise one or more of a sub CPU 61, an image processing data storage device 62, a second storage device (e.g., the driving data storage device 63), a nonvolatile storage device 64, a third storage device (e.g., a descriptor storage device 65), and a transmitter (e.g., a direct memory access ("DMA") controller 66). The sub CPU 61, the image processing data storage device 62, the driving data storage device 63, the nonvolatile storage device 64, the descriptor storage device 65, and the DMA controller 66 may be interconnected, via a bus 69, to communicate with each other.

The second controller 60 may be connected to one or more of an image processing I/F 34 and a transmission I/F 35, via the bus 69. The image processing I/F 34 may be connected to the first controller 40, via the serial bus 26. The transmission I/F 35 may be connected to the engine controller 80, via a serial bus 28, which may allow one-way data communication from the second controller 60 to the engine controller 80. Consequently, data communication from the engine controller 80 to the second controller 60 may not be performed.

The sub CPU 61 may be a CPU that may be used for image processing to convert the image data into the driving data. In certain configurations, the sub CPU 61 may be used exclusively for image processing to convert the image data into the driving data. The processing speed of the sub CPU 61 may be greater than (e.g., faster than) the processing speed of the main CPU 41. Therefore, the data processing speed of the second controller 60 may be greater than the processing speed of the first controller 40. Because the data processing speed of the second controller 60 may be greater than the processing speed of the first controller 40, the second controller 60 may perform the image processing more quickly than the first controller 40.

The image processing data storage device 62 may be configured to store image processing data received by the image processing I/F 34. The driving data storage device 63 may be configured to store driving data generated by the sub CPU 61. The driving data for an inkjet printer may be data representing amounts of ink ejected from the inkjet print head 1 per device region of a sheet. Image data (e.g., data described in page description language ("PDL") may be converted into the driving data using a known error diffusion method multi-value processing may be performed). In other image recording apparatuses (e.g., a laser printer), print data (e.g., PDL data) may be converted into the driving data for driving a recording device (e.g., a laser recording device) using known dithering.

The nonvolatile storage device 64 may store a general-purpose operating system 64a and various programs 64b (e.g., computer-readable instructions). The computer-readable instructions stored in the nonvolatile storage device 64 may instruct the sub CPU 61 to operate as one or more of an image processing device 71, a specific information generating device 72, and a DMA controlling device 73.

In certain configurations, the image processing performed in the second controller 60 may not require real time responses. Accordingly, the operating system of the second controller 60 may be the general-purpose operating system 64*a*. Thus, the second controller 60 may be designed flexibly.

The descriptor storage device 65 may be configured to store a descriptor required for DMA transfer processing by the DMA controller 66. The descriptor may comprise address information of transfer data in the DMA transfer processing. More specifically, the address information may comprise a transfer source beginning address and a transfer source ending address of the storage location or storage area of the transfer data in the driving data storage device 63.

The DMA controller 66 may be configured to perform the DMA transfer processing, in which the driving data stored in the driving data storage device 63 may be transferred to the engine controller 80, in place of the sub CPU 61. In particular, when the DMA controller 66 receives a startup instruction from the sub CPU 61, the DMA controller 66 may be configured to read the descriptor stored in the descriptor storage device 65. The DMA controller 66 may be configured to transfer particular data stored in the driving data storage device 63 to the engine controller 80, via the transmission I/F 35. The particular stored in the driving data storage device 63 may comprise data in a range from the transfer source beginning address to the transfer source ending address. When the DMA transfer processing ends, the DMA controller 66 may be configured to transmit transfer end information to the sub CPU 61. The transfer end information may be data indicating that the DMA transfer processing has ended.

Functions of the sub CPU 61 operating as one or more of the image processing device 71, the specific information generating device 72, and the DMA controlling device 73 in cooperation with the computer-readable instructions stored in the nonvolatile storage device 64 are described in detail below. The image processing device 71 and the specific information generating device 72 may be configured to control main processing of the second controller 60. The DMA controlling device 73 may be configured to control interrupt processing, which may be performed by interrupting the main processing.

The image processing device 71 may be configured to extract pieces (e.g., all pieces or a portion thereof) of image data from the image processing data stored in the image processing data storage device 62 and generate the driving data for each piece of the image data. The image processing device 71 may be configured to store the generated driving data in the driving data storage device 63. When generation of the driving data based on the image data comprised in the received image processing data is completed, the image processing device 71 may be configured to transmit processing end information to the first controller 40, via the image processing I/F 34. The processing end information may comprise data indicating that image processing has ended.

The specific information generating device 72 may be configured to generate specific information for each piece of the driving data stored in the driving data storage device 63 by the image processing device 71. The specific information may specify the storage location of the driving data in the driving data storage device 63. Each time the specific information generating device 72 generates the specific information, the specific information generating device 72 may be configured to transmit the driving data related information to the first controller 40, via the image processing I/F 34. In particular, the specific information generating device 72 may be configured to extract the image data attribute information of the image data corresponding to the generated driving data from the image processing data stored in the image processing data storage device 62. The specific information generating device 72 may be configured to generate the driving data attribute information comprising one or more of the extracted image data attribute information and the size of the generated driving data. The specific information generating device 72 may be configured to transmit the driving data related information comprising the one or more of the driving data attribute information and the specific information to the first controller 40, via the image processing I/F 34.

The DMA controlling device 73 may be configured to monitor for one or more of the reception of the driving data transmission instruction (e.g., specific information) from the first controller 40 and the reception of the transfer end information from the DMA controller 66. When the DMA controlling device 73 receives one or more of the driving data transmission instruction and the transfer end information, the DMA controlling device 73 may be configured to interrupt the main processing performed by one or more of the image processing device 71 and the specific information generating device 72. The DMA controlling device 73 may perform the interrupt processing in preparation for the DMA controller 66 to perform the DMA transfer processing.

The engine controller 80 may comprise one or more of an engine CPU 81, an engine memory 82, a nonvolatile storage device 83, a control data storage device 84, and a counter storage device 85. The engine CPU 81, the engine memory 82, the nonvolatile storage device 83, the control data storage device 84, and the counter storage device 85 may be interconnected to communicate with each other, via a bus 89.

The engine controller 80 may be connected to a control 36, a receiving I/F 37, the inkjet print head 1, the sheet feeding mechanism (not shown), and the transferring mechanism 20, via the bus 89. The control I/F 36 may be connected to the first controller 40, via the serial bus 27. The receiving I/F 37 may be connected to the second controller 60, via the serial bus 28.

The engine CPU 81 may be a CPU configured to control one or more of the driving of the inkjet print head 1, the sheet feeding mechanism (not shown), and the transferring mechanism 20 for printing. The engine memory 82 may be configured to store the driving data received via the receiving I/F 37. The storage capacity of the engine memory 82 may be less than the storage capacity of the driving data storage device 63 of the second controller 60.

The nonvolatile storage device 83 may store computer-readable instructions, which may be executed by the engine CPU 81. The computer-readable instructions stored in the nonvolatile storage device 83 may instruct the engine CPU 81 to operate as one or more of a driving controlling device 91 and a driving data managing device 92.

The control data storage device 84 may be configured to store the control data comprised in the print instruction (shown in FIG. 3D) received by the control I/F 36. The counter storage device 85 may be configured to store the number of pieces of unprinted data left in a print job being performed. In particular, the number of pieces of the unprinted data may represent the number of remaining pieces of the driving data that have not yet been printed on the sheet P. In some configurations, one piece of the driving data may, for example, correspond to one page of the sheet P. Accordingly, the number of remaining pieces of the driving data that have not yet been printed may correspond to the number of the remaining pages which have not been printed.

The driving controlling device 91 may be configured to control one or more of the inkjet print head 1, the sheet feeding mechanism (not shown), and the transferring mechanism 20 to print an image associated with the driving data stored in the engine memory 82 on the sheet P, based on the quality mode of the control data stored in the control data storage device 84. In particular, the driving controlling device 91 may be configured to provide the driving data stored in the engine memory 82 to the inkjet print head 1, and the inkjet print head 1 may be configured to eject ink from the ejection holes thereof in sync with the feeding of the sheet P by the transferring mechanism 20.

The driving data managing device 92 may be configured to transmit a driving data transmission request to the first controller 40 when a storage area in which the driving data may be stored becomes available in the engine memory 82 after the print instruction is received from the first controller 40, via the control I/F 36. The driving data transmission request may comprise data that requests the second controller 60 to transmit the driving data to the engine controller 80. When the driving controlling device 91 finishes printing an image associated with the driving data, the driving data managing device 92 may be configured to delete the driving data from the engine memory 82.

Operations of the first controller 40 now are described with reference to FIG. 4. The main CPU 41 may determine whether the network I/F 31 has received a print job (step A1). When the main CPU 41 determines that the network I/F 31 has received the print job (step A1: YES), the main CPU 41 may store the print job received by the network I/F 31 in the print job storage device 42 (step A2). Subsequently, the main CPU 41 may determine whether the image processing flag stored in the flag storage device 45 is set to the on state (step A3). When the main CPU 41 determines that the image processing flag is set to the on state (step A3: YES), the main CPU 41 may determine not to transmit the image processing data to the second controller 60. The main CPU 41 may either change the waiting flag stored in the flag storage device 45 from the off state to the on state when the waiting flag is set to the off state or maintain the waiting flag in the on state when the waiting flag is set to the on state (step A4). Subsequently, processing may return to step A1. Consequently, when the second controller 60 is performing the image processing, the image processing data may not be transmitted from the first controller 40 to the second controller 60. Thus, loads applied to the second controller 60 may be reduced while the second controller 60 performs the image processing, such that the image processing speed of the second controller 60 may not be reduced.

When the main CPU 41 determines that the image processing flag is turned off (step A3: NO), the main CPU 41 may extract pieces of the image data from the print job stored first in the print job storage device 42 among one or more print jobs stored in the print job storage device 42. The main CPU 41 may generate the image processing data (shown in FIG. 3C) comprising the extracted pieces of the image data and the image data attribute information for each extracted piece of the image data. The main CPU 41 may transmit the generated image processing data to the second controller 60, via the image processing I/F 32 (step A5). The main CPU 41 may extract the control data (e.g., information about the quality mode and the total number of pages) from the print job stored first in the print job storage device 42 among one or more print jobs stored in the print job storage device 42. The main CPU 41 may transmit the print instruction comprising the extracted control data to the engine controller 80, via the control I/F 33 (step A6). Subsequently the main CPU 41 may delete the print job stored first in the print job storage device 42 from the print job storage device 42 (step A7). Subsequently, the main CPU 41 may turn on the image processing flag stored in the flag storage device 45 from the off state (step A8). Subsequently, processing may return to step A1.

At step A1, when the main CPU 41 determines that the network I/F 31 has not received the print job (step A1: NO), the main CPU 41 may determine whether the image processing I/F 32 has received the driving data related information (shown in FIG. 3B) from the second controller 60 (step A9). When the main CPU 41 determines that the image processing I/F 32 has received the driving data related information (step A9: YES), the main CPU 41 may store the received driving data related information in the specific information storage device 44 (step A10). Subsequently, the main CPU 41 may determine whether the reception waiting flag stored in the flag storage device 45 is set to the on state (step A11). When the main CPU 41 determines that the reception waiting flag is not set to the on state (step A11: NO), the main CPU 41 may determine that the driving data transmission request has not been received from the engine controller 80 and that the driving data does not yet have to be transmitted from the second controller 60 to the engine controller 80. Subsequently, processing may return to step A1. When the main CPU 41 determines that the reception waiting flag is set to the on state (step A11: YES), processing may proceed to step A14.

At step A9, when the main CPU 41 determines that the image processing I/F 32 has not received the driving data related information (step A9: NO), the main CPU 41 may determine whether the control I/F 33 has received the driving data transmission request from the engine controller 80 (step A12). When the main CPU 41 determines that the control 33 has received the driving data transmission request (step A12: YES), the main CPU 41 may determine whether the driving data related information is stored in the specific information storage device 44 (step A13). More specifically, the main CPU 41 may determine whether the driving data to be transmitted to the engine controller 80 is stored in the driving data storage device 63 of the second controller 60. When the main CPU 41 determines that the driving data related information is stored in the specific information storage device 44 (step A13: YES), processing may proceed to step A14.

At step A14, the main CPU 41 may determine the transfer driving data related information from among one or more pieces of the driving data related information stored in the specific information storage device 44 (step A14). As described above, the transfer driving data related information may be the driving data related information of the driving data subsequently to be transmitted to the engine controller 80 from among one or more pieces of the driving data stored in the driving data storage device 63 of the second controller 60.

The main CPU 41 may extract specific information from the driving data related information that is determined to be the transfer driving data related information. The main CPU 41 may transmit the driving data transmission instruction comprising the extracted specific information to the second controller 60, via the image processing I/F 32 (step A15). Thus, the driving data associated with the transfer driving data related information may be transmitted from the second controller 60 to the engine controller 80.

When the process at step A15 ends, the main CPU 41 may delete the transfer driving data related information from the specific information storage device 44 (step A16). The main CPU 41 may change the reception waiting flag stored in the flag storage device 45 from the off state to the on state (step A17). Subsequently, processing may return to step A1.

At step A13, when the main CPU 41 determines that the driving data related information is not stored in the specific information storage device 44 (step A13: NO), the main CPU 41 may change the reception waiting flag stored in the flag storage device 45 from the on state to the off state (step A18). Subsequently, processing may return to step A1.

At step A12, when the main CPU 41 determines that the control I/F 33 has not received the driving data transmission request from the engine controller 80 (step A12: NO), the main CPU 41 may determine whether the image processing I/F 32 has received the processing end information indicating that the image processing by the second controller 60 has ended (step A19). When the main CPU 41 determines that the image processing I/F 32 has not received the processing end information (step A19: NO), processing may return to step A1.

When the main CPU 41 determines that the image processing I/F 32 has received the processing end information (step A19: YES), the main CPU 41 may determine whether the waiting flag stored in the flag storage device 45 is set to the on state (step A20). When the main CPU 41 determines that the waiting flag is not set to the on state (step A20: NO), the main CPU 41 may determine that no print job is stored in the print job storage device 42. Consequently, the main CPU 41 may change the image processing flag stored in the flag storage device 45 from the on state to the off state (step A21). Subsequently, processing may return to step A1.

When the main CPU 41 determines that the waiting flag is set to the on state (step A20: YES), the main CPU 41 may determine that a print job that is waiting to be printed is stored in the print job storage device 42. Consequently, the main CPU 41 may extract pieces (e.g., all pieces or a portion thereof) of the image data from the print job stored first in the print job storage device 42 from among one or more print jobs stored in the print job storage device 42. The main CPU 41 may generate the image processing data (shown in FIG. 3C) comprising the extracted pieces of the image data and the image data attribute information for each extracted piece of the image data. The main CPU 41 may transmit the generated image processing data to the second controller 60, via the image processing I/F 32 (step A22). The main CPU 41 may extract the control data from the print job stored first in the print job storage device 42 from among the one or more print jobs stored in the print job storage device 42. The main CPU 41 may transmit the print instruction comprising the extracted control data to the engine controller 80, via the control I/F 33 (step A23).

The main CPU 41 may delete the print job first stored in the print job storage device 42 (step A24). Thereafter, the main CPU 41 may determine whether another print job is stored in the print job storage device 42 (step A25). When the main CPU 41 determines that another print job that is waiting to be printed is stored in the print job in the storage device 42 (step A25: YES), processing may return to step A1. When the main CPU 41 determines that no other print job is waiting to be printed is stored in the print job storage device 42 (step A25: NO), the main CPU 41 may change the waiting flag stored in the flag storage device 45 from the on state to the off state (step A26). Subsequently, processing may return to step A1.

Main processing of the second controller 60 now is described with reference to FIG. 54. The sub CPU 61 may determine whether the image processing I/F 34 has received the image processing data (shown in FIG. 3C) (step B1). When the sub CPU 61 determines that the image processing I/F 34 has not received the image processing data (step B1: NO), the process at step B1 may be repeated until the image processing I/F 34 has received the image processing data.

When the sub CPU 61 determines that the image processing I/F 34 has received the image processing data (step B1: YES), the sub CPU 61 may store the image processing data received by the image processing I/F 34 in the image processing data storage device 62 (step B2). Subsequently, the sub CPU 61 may extract one piece of the image data from the image processing data stored in the image processing data storage device 62 and may generate the driving data based on the one piece of the image data (step B3). The sub CPU 61 may store the generated driving data in the driving data storage device 63 (step B4). The sub CPU 61 may generate specific information for specifying the storage location of the driving data stored in the driving data storage device 63 at step B4 (step B5).

The sub CPU 61 may extract the image data attribute information of the image data, which may correspond to the driving data associated with the generated specific information, from the image processing data stored in the image processing data storage device 62. The sub CPU 61 may generate the driving data attribute information comprising one or more of the extracted image data attribute information and the size of the generated driving data (step B6). The sub CPU 61 may transmit the driving data related information (shown in FIG. 3B), which may comprise the driving data attribute information and the specific information to the first controller 40, via the image processing I/F 34 (step B7).

The sub CPU 61 may determine whether there is a piece of the image data that has not yet been used to generate driving data (e.g., image processing is not performed) among the one or more pieces of the image data comprised in the image processing data and stored in the image processing data storage device 62 (step B8). When the sub CPU 61 determines that there is a piece of the image data that has not yet been used to generate driving data (step B8: YES), processing may return to step B3. When the sub CPU 61 determines that there is not a piece of the image data that has not yet been used to generate driving data (step B8: NO), the sub CPU 61 may delete the image processing data stored in the image processing data storage device 62. The sub CPU 61 may transmit the processing end information representing the image processing has ended, to the first controller 40, via the image processing I/F 34 (step B9). Subsequently, processing may return to step B1.

Interrupt processing of the second controller 60 now is described with reference to FIG. 5B. The interrupt processing may be performed by interrupting the main processing when a cause of interrupt occurs.

When a cause of interrupt is received by the image processing I/F 34 and the cause of interrupt comprises the driving data transmission instruction (step C1: YES), the sub CPU 61 may store in the descriptor storage device 65 a descriptor defining the beginning address and the ending address specified in the specific information from the driving data transmission instruction as the transfer source beginning address and the transfer source ending address, respectively (step C2). Subsequently, the sub CPU 61 may determine whether the DMA controller 66 is performing the DMA transfer processing (step C3). When the sub CPU 61 determines that the DMA controller 66 is performing the DMA transfer processing (step C3: YES), the interrupt processing may end and the process may proceed to the main processing process.

When the sub CPU 61 determines that the DMA controller 66 is not performing the DMA transfer processing (step C3: NO), the sub CPU 61 may transmit the startup instruction to the DMA controller 66 (step C4). The startup instruction may comprise a descriptor address that may represent the storage location of the descriptor in the descriptor storage device 65. The DMA controller 66 may read the descriptor stored in the descriptor storage device 65 to start the DMA transfer processing. When the process at step C4 ends, the interrupt processing may end and the process may proceed to the main processing process.

At step C1, when a cause of interrupt is received by the image processing I/F 34 and the cause of interrupt comprises receiving the transfer end information from the DMA controller 66 (step C1: NO), the sub CPU 61 may determine whether a descriptor that has not been read by the DMA controller 66 is stored in the descriptor storage device 65 (step C5). When the sub CPU 61 determines that no descriptor stored in the descriptor storage device 65 has not been read by the DMA controller 66 (step C5: NO), the interrupt processing may end and the process may proceed to the main processing process.

When the sub CPU 61 determines that a descriptor that has not been read by the DMA controller 66 is stored in the descriptor storage device 65 (step C5: YES), the sub CPU 61 may transmit the startup instruction to the DMA controller 66 (step C6). The startup instruction may comprise a descriptor address representing the storage location of the descriptor stored first in the descriptor storage device 65 from among the one or more descriptors stored in the descriptor storage device 65. When the process at step C6 ends, the interrupt processing may end and the process may proceed to the main processing process.

Operations of the DMA controller 66 now are described with reference to FIG. 5C. The DMA controller 66 may determine whether the startup instruction is received from the sub CPU 61 (step D1). When the DMA controller 66 determines that the startup instruction has not been received from the sub CPU 61 (step D1: NO), process at step D1 may be repeated until the startup instruction is received from the sub CPU 61.

When the DMA controller 66 determines that the startup instruction is received from the sub CPU 61 (step D1: YES), the DMA controller 66 may read the descriptor from the storage location of the descriptor storage device 65 represented by the descriptor address specified in the startup instruction (step D2). Subsequently, the DMA controller 66 may refer to the read descriptor and perform the DMA transfer processing to transfer the data stored in a location of the driving data storage device 63, which corresponds to locations in a range from the transfer source beginning address to the transfer source end address, to the engine controller 80, via the transmission I/F 35 (step D3).

The DMA controller 66 may determine whether the DMA transfer processing has ended (step D4). When the DMA controller 66 determines the DMA transfer processing has not ended (step D4: NO), processing may return to step D3. When the DMA controller 66 determines that the DMA transfer processing has ended (step D4: YES), the DMA controller 66 may transmit the transfer end information, which may indicate that the DMA transfer processing has ended, to the sub CPU 61 (step D5). Subsequently, processing may return to step D1.

Figure 6:
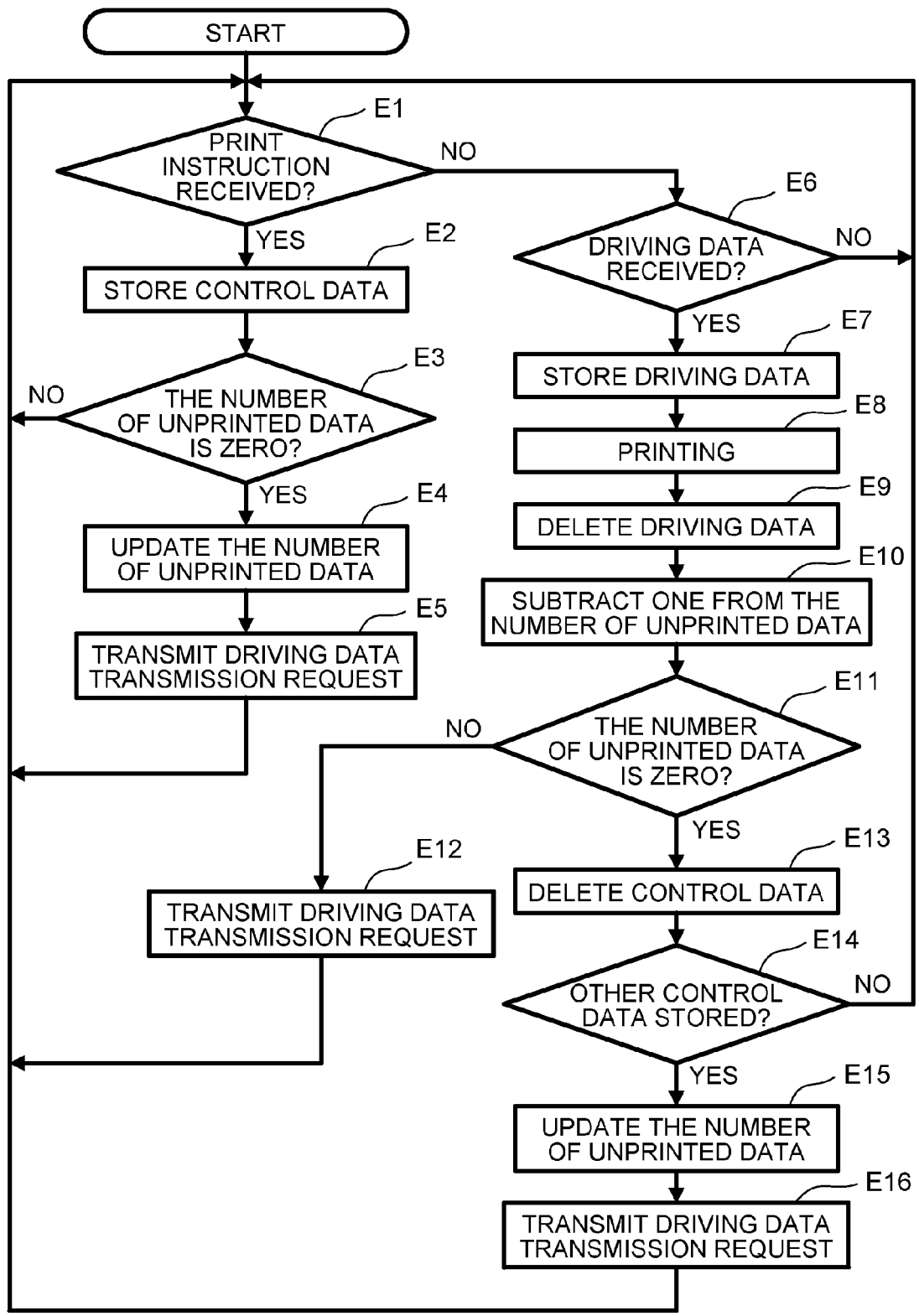
FIG. 6 is a flow sheet that shows a process performed by the engine controller of FIG. 2.

Operations of the engine controller 80 now are described with reference to FIG. 6. The engine CPU 81 may determine whether the control I/F 36 has received the print instruction (step E1). When the engine CPU 81 determines that the control I/F 36 has received a print instruction (step E1: YES), the engine CPU 81 may store the control data comprised in the print instruction in the control data storage device 84 (step E2). Subsequently, the engine CPU 81 may determine whether the number of pieces of unprinted data stored in the counter storage device 85 is zero (e.g., a predetermined number) (step E3). In certain configurations, the engine CPU 81 may determine whether the number of pieces of unprinted data stored in the counter storage device 85 is less than or equal to the predetermined number (e.g., zero, another number). When the engine CPU 81 determines that the number of the unprinted data in the counter storage device 85 is not zero (step E3: NO), the engine CPU 81 may determine that printing of another print job is being performed. Subsequently, processing may return to step E1.

At step E3, when the engine CPU 81 determines that the number of the unprinted data in the counter storage device 85 is zero (step E3: YES), the engine CPU 81 may determine that printing is not currently being performed, and the engine CPU 81 may update the number of the number of pieces of unprinted data stored in the counter storage device 85 to the value of the print job's total number of pages specified in the control data stored in the control data storage device 84 or a number that corresponds thereto (step E4). The engine CPU 81 may transmit the driving data transmission request to the first controller 40, via the control I/F 36 (step E5). Subsequently, processing may return to step E1.

At step E1, when the engine CPU 81 determines that the control I/F 36 has not received the print instruction (step E1: NO), the engine CPU 81 may determine whether the receiving I/F 37 has received the driving data (step E6). When the engine CPU 81 determines that the receiving I/F 37 has not received the driving data (step E6: NO), processing may return to step E1. When the engine CPU 81 determines that the receiving I/F 37 has received the driving data (step E6: YES), the engine CPU 81 may store the driving data received by the receiving I/F 37 in the engine memory 82 (step E7). The engine CPU 81 may control the inkjet print head 1, the sheet feeding mechanism (not shown), and the transferring mechanism 20 to perform printing associated with the driving data stored in the engine memory 82 based on the quality mode specified in the control data first stored in the control data storage device 84 from among the one or more pieces of the control data stored in the control data storage device 84 (step E8).

The engine CPU 81 may delete the driving data from the engine memory 82 when printing corresponding to the driving data is finished at step E8 (step E9). The engine CPU 81 may update the number of the unprinted data stored in the counter storage device 85 (e.g., subtract one (1) from the number of the unprinted data stored in the counter storage device 85) (step E10).

The engine CPU 81 may determine whether the number of the unprinted data stored in the counter storage device 85 is zero (e.g., a particular predetermined number) (step E11). When the engine CPU 81 determines that the number of the unprinted data is not zero (step E11: NO), the engine CPU 81 may transmit the driving data transmission request to the first controller 40 via the control I/F 36 (step E12). The driving data transmission request may indicate which unprinted data is to be printed subsequently. In particular, the driving data transmission request may specify driving data waiting to be used for printing, which is not currently stored in the engine memory 82 and which has not been used for printing, as driving data to be used for printing earliest among driving data to be used for printing that is not currently stored in the engine memory 82. Subsequently, processing may return to step E1.

When the engine CPU 81 determines that the number of the unprinted data is zero (step E11: YES), the engine CPU 81 may determine that printing of all driving data of the print job that currently is being printed is finished. The engine CPU 81 may delete the control data that is associated with the print job from the control data storage device 84 when the printing associated with the print job is finished (step E13). Accordingly, the engine CPU 81 may delete the control data first stored in the control data storage device 84 from among the one or more pieces of the control data stored in the control data storage device 84. Subsequently, the engine CPU 81 may determine whether other control data is stored in the control data storage device 84 (step E14). When the engine CPU 81 determines that other control data is not stored in the control data storage device 84 (step E14: NO), processing may return to step E1.

When the engine CPU 81 determines that other control data is stored in the control data storage device 84 (step E14: YES), the engine CPU 81 may update the number of unprinted data stored in the counter storage device 85 to the value of the print job's total number of pages, which is specified in the control data first stored in the control data storage device 84 from among the one or more pieces of the control data stored in the control data storage device 84 (step E15). The engine CPU 81 may transmit the driving data transmission request to the first controller 40, via the control I/F 36 (step E16). Subsequently, processing may return to step E1.

Figure 5A:
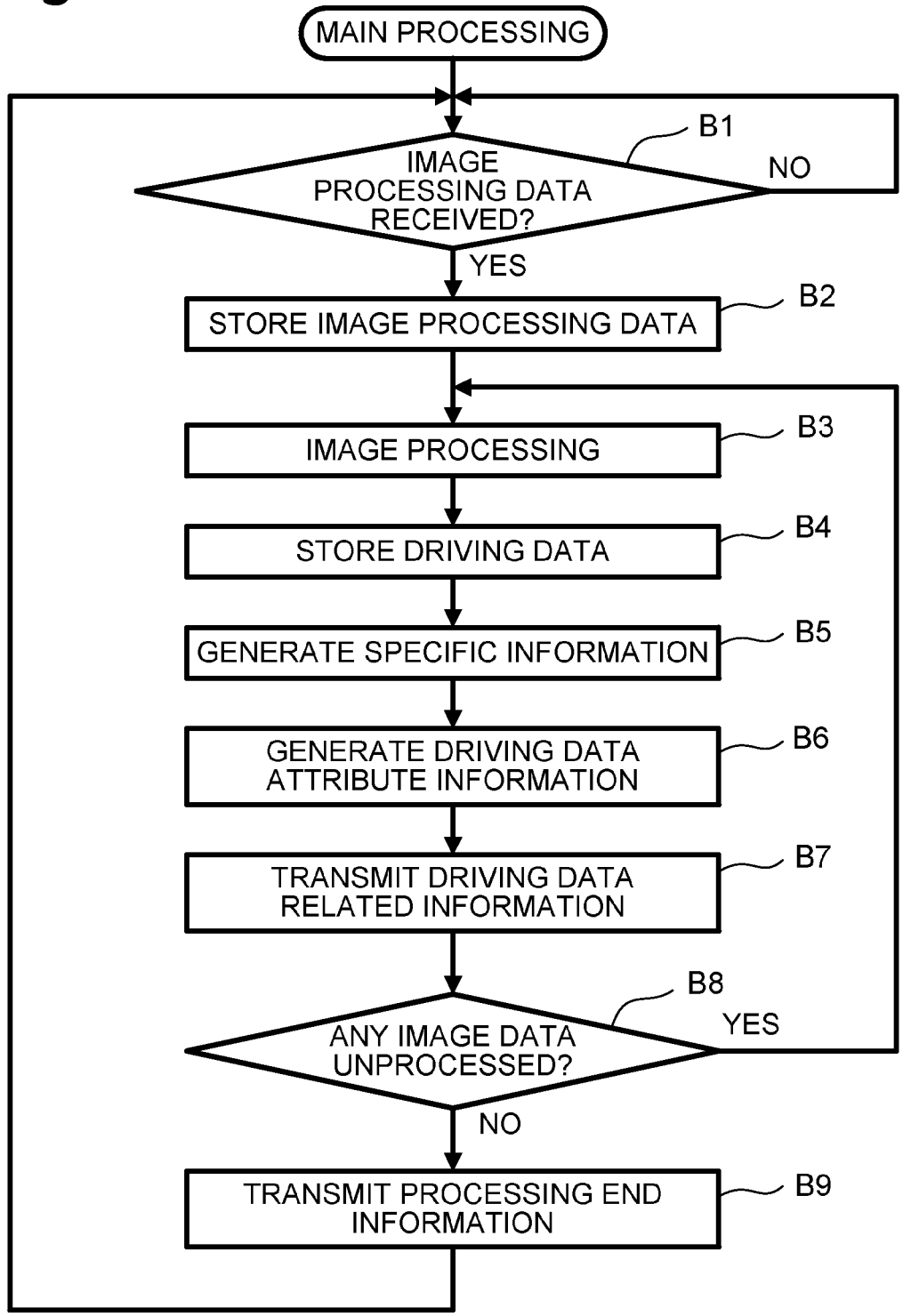
FIG. 5A is a flow sheet that shows a main processing process that may be performed by the second controller of FIG. 2.

Processes being performed during the period from when the network I/F 31 receives a print job to when the driving data associated with the image data is transmitted to the recording device 2 are described with reference to FIGS. 4-6. The image data may be transmitted from the network I/F 31 to the first controller 40. The first controller 40 may store the image data in the print job storage device 42 (at step A2 in FIG. 4). Thereafter, the first controller 40 may transmit the image processing data to the second controller 60 (at step A5 in FIG. 4). Subsequently, the second controller 60 may generate the driving data based on the image data received from the first controller 40 (at step B3 in FIG. 5A). The second controller 60 may store the driving data in the driving data storage device 63 (at step B4 in FIG. 5A). The second controller 60 may generate the specific information for specifying the storage location of the driving data stored in the driving data storage device 63 (at step 135 in FIG. 5A). The second controller 60 may transmit the driving data related information to the first controller 40 (at step B7 in FIG. 5A).

Thereafter, the first controller 40 may store the driving data related information received from the second controller 60 in the specific information storage device 44 (at step A10 in FIG. 4). When the first controller 40 receives the driving data transmission request from the recording device 2 (at step A12 in FIG. 4), the first controller 40 may transmit the driving data transmission instruction based on the specific information stored in the specific information storage device 44 to the second controller 60 (at step A15 in FIG. 4).

The second controller 60 may transfer the driving data, which is stored in the driving data storage device 63 and specified by the driving data transmission instruction received from the first controller 40, to the recording device 2 (at step C4 in FIG. 5B and at step D3 in FIG. 5C).

As described above, in the inkjet printer 101 according to embodiments described herein, when the driving data is transmitted from the second controller 60 to the engine controller 80, the second controller 60 may not have to search for the address where the driving data to be transmitted to the engine controller 80 is stored in the driving data storage device 63. Therefore, loads applied to the second controller 60 by processing other than the image processing may be reduced. Consequently, a component with less data processing capacity may be employed for the second controller 60. Thus, the cost of the second controller 60 may be reduced. When a component with great processing capacity is employed for the second controller 60 configured to perform the image processing, the cost of the second controller 60 may become great, which may lead to increases in the costs of the inkjet printer 101. Therefore, costs of the inkjet printer 101 may be reduced by employing a component with less data processing capacity for the second controller 60 in accordance with aspects of the invention. Processing currently performed by the second controller 60 other than the image processing now may be performed by the first controller 40, such that the costs required for the first controller 40 and the second controller 60 may be reduced, for example, by employing a component with less processing capacity for both the first controller 40 and the second controller 60. Thus, costs of the inkjet printer 101 may be further reduced.

The first controller 40 may determine the transfer driving data related information, such that the driving data to be transmitted from the second controller 60 to the engine controller 80 may be determined. Therefore, loads applied to the second controller 60 by the process of determining the transfer driving data related information may be reduced. Consequently, a component with less data processing capacity may be employed for the second controller 60, which may lead to a reduction in the cost of the second controller 60.

When the second controller 60 generates the specific information, the second controller 60 may transmit the driving data related information comprising the generated specific information to the first controller 40. Thus, the first controller 40 may manage the information (e.g., the number of pieces of the driving data stored in the driving data storage device 63 of the second controller 60) sequentially.

Data may not be transmitted from the engine controller 80 to the second controller 60. In particular, data may be transmitted from the engine controller 80 to the first controller 40 without passing through the second controller 60. Therefore, the second controller 60 may not receive unnecessary information for the image processing. Consequently, loads applied to the second controller 60 by processing other than the image processing may be reduced. Consequently, a component with lower data processing capacity may be employed for the second controller 60, which may lead to cost reduction of the second controller 60.

Other aspects of the invention now are described with reference to FIGS. 7A-10B. A first controller 140 may be configured to control the DMA controller 66. Every time the second controller 60 generates the driving data related information (e.g., specific information), the second controller 60 may be configured to transmit the driving data related information to the first controller 40. A second controller 160, however, may be configured to transmit collectively a plurality of pieces of the driving data related information to the first controller 140. The inkjet printer 101 may comprise a reprint function to reprint an image associated with a printed driving data with a reprint instruction after the recording device 2 finishes printing the image associated with the driving data on the sheet P. Like numerals in the drawings denote like components and the detailed description of those components described above is omitted, with respect to FIGS. 7A-10B.

The inkjet printer 101 may comprise a controlling device 200. The controlling device 200 may comprise the first controller 140, the second controller 160, and the engine controller 80.

Figure 7A:
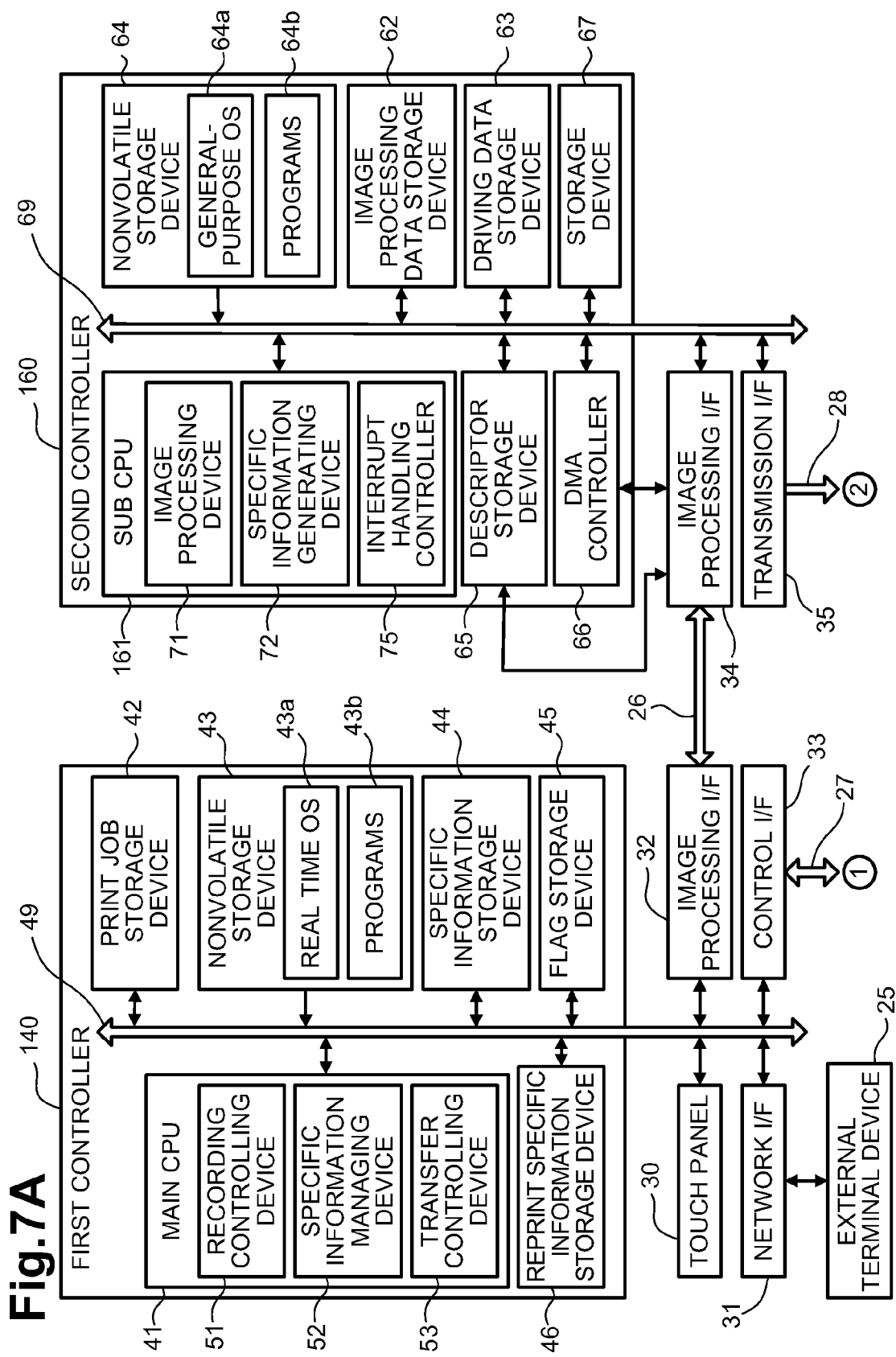
FIG. 7A is a diagrammatic view that shows components of an inkjet printer according to one or more other aspects of the invention.
Figure 7B:
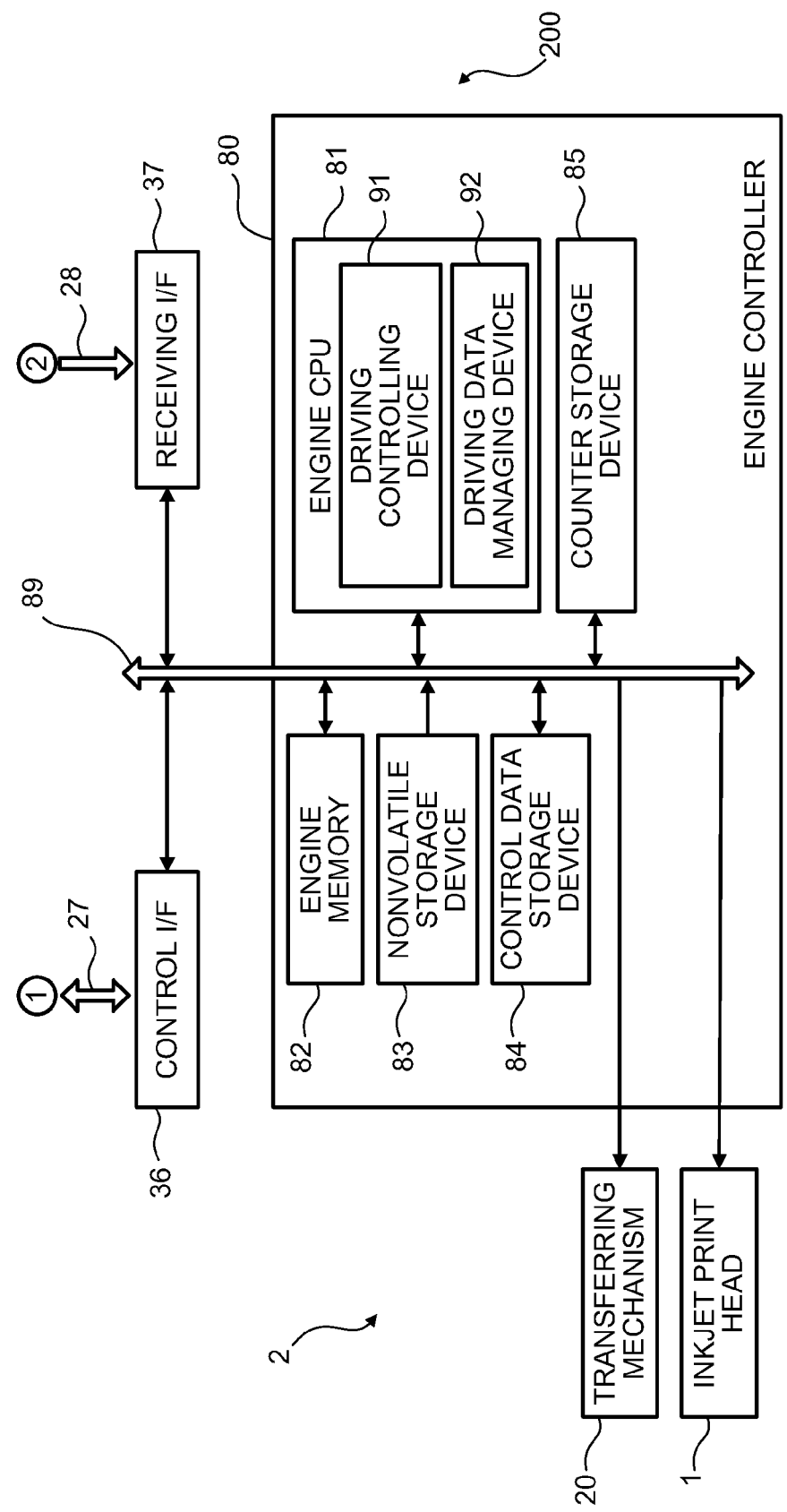
FIG. 7B is a diagrammatic view that shows other components of the inkjet printer according to the one or more other aspects of the invention.

As shown in FIGS. 7A and 7B, the first controller 140 may comprise a reprint specific information storage device 46. The reprint specific information storage device 46 may be configured to store reprint driving data related information received from the second controller 160, via the image processing I/F 32. The reprint driving data related information may comprise reprint specific information for specifying the storage location of the driving data stored in a storage device 67 of the second controller 160 and the driving data attribute information of the driving data.

The second controller 160 may further comprise a storage device 67 that may have a storage capacity greater than a storage capacity of the driving data storage device 63. The storage device 67 may be configured to store the driving data converted from the image data by a sub CPU 161. The second controller 160 may comprise an interrupt handling controlling device 75, rather than the DMA controlling device 73. The interrupt handling controlling device 75 may be configured to monitor for the reception of a specific information transmission request from the first controller 140 and a reprint specific information transmission request. When the second controller 160 receives the specific information transmission request or the reprint specific information transmission request, the second controller 160 may be configured to interrupt the main processing performed by the image processing device 71 and the specific information generating device 72 and perform interrupt processing. The transfer controlling device 53 of the first controller 140 may comprise a function relating to the DMA transfer processing, which may be similar to the DMA controlling device 73 described above.

The descriptor storage device 65 of the second controller 160 may be connected to the image processing I/F 34. The main CPU 41 of the first controller 140 may be configured to store data directly in the descriptor storage device 65 and to access the data stored in the descriptor storage device 65 via the serial bus 26. Similarly, the DMA controller 66 of the second controller 160 may be connected to the image processing I/F 34. The main CPU 41 may be configured to control the DMA controller 66 directly via the serial bus 26. The DMA controller 66 may be configured to transmit the transfer end information to the main CPU 41, rather than to the sub CPU 161.

The transfer controlling device 53 of the first controller 140 may be configured to extract the specific information from the driving data related information determined to be the transfer driving data related information by the specific information managing device 52. The transfer controlling device 53 may be configured to store in the descriptor storage device 65 a descriptor. The descriptor may define a beginning address and an ending address, which are specified in the extracted specific information, as the transfer source beginning address and the transfer source ending address, respectively. The transfer controlling device 53 may be configured to transmit the startup instruction to the DMA controller 66.

The image processing device 71 of the second controller 160 may be configured to store the generated driving data in the storage device 67 as well as the driving data storage device 63. The specific information generating device 72 may be configured to generate the reprint driving data related information as well as the driving data related information. The generated driving data related information may be stored in the driving data storage device 63. The generated reprint driving data related information may be stored in the storage device 67.

The specific information managing device 52 of the first controller 140 may be configured to transmit the specific information transmission request to the second controller 160, via the image processing I/F 32. The specific information transmission request may comprise a request (e.g., data) for the second controller 160 to transmit the driving data related information stored in the driving data storage device 63 to the first controller 140. The specific information managing device 52 may be configured to transmit the reprint specific information transmission request to the second controller 160, via the image processing I/F 32. The reprint specific information transmission request may comprise a request (e.g., data) for the second controller 160 to transmit the reprint driving data related information stored in the storage device 67 to the first controller 140.

Figure 8A:
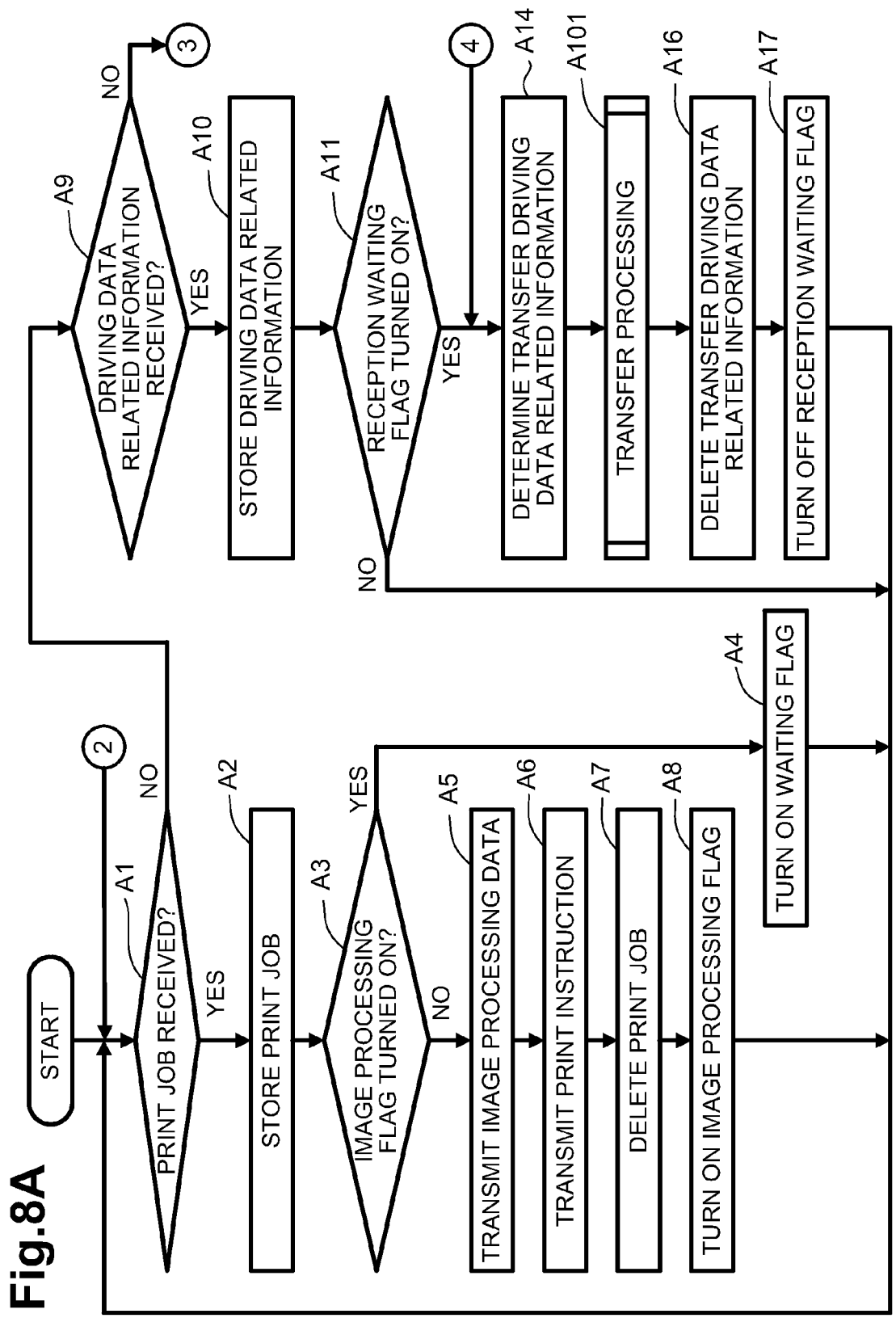
FIG. 8A is a flow sheet that shows a portion of a process that may be performed by the first controller of FIG. 7.

Operations of the first controller 140 now are described with reference to FIGS. 8A-9B. As shown in FIG. 8A, the first controller 140 may be configured to perform transfer processing at step A101. The transfer processing performed at step A101 now is described with reference to FIG. 9A.

Figure 9B:
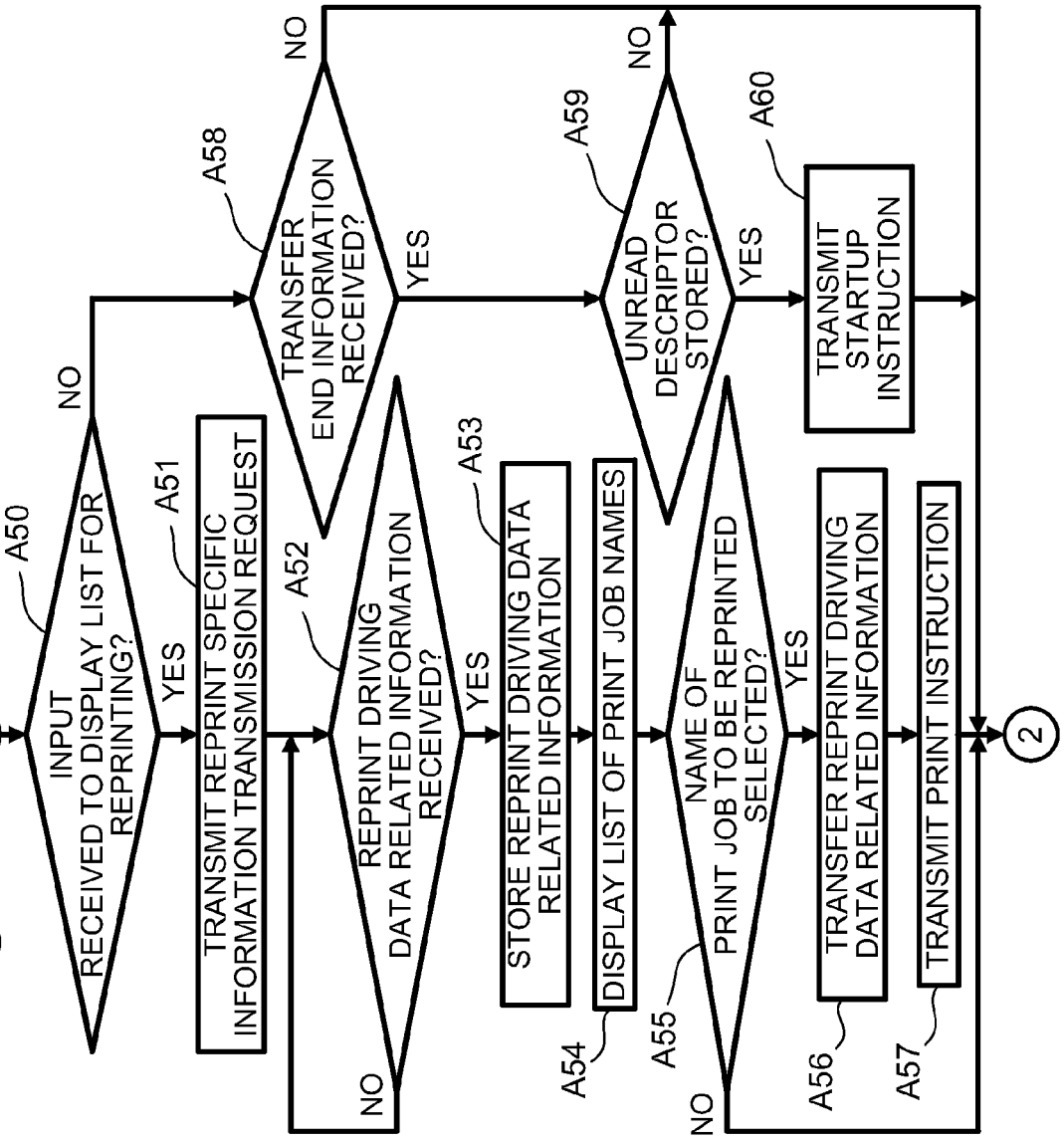
FIG. 9B is a flow sheet that shows still another portion of the process that may be performed by the first controller of FIG. 7.
Figure 9A:
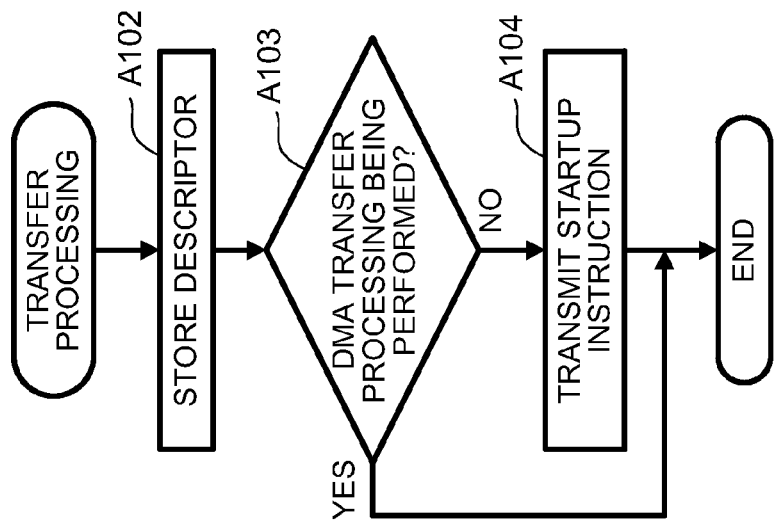
FIG. 9A is a flow sheet that shows a transfer processing process that may be performed by the first controller of FIG. 7.

As shown in FIG. 9A, the main CPU 41 of the first controller 140 may extract the specific information from the driving data related information, which by the specific information managing device 52 determined to be the transfer driving data related information. The main CPU 41 may store in the descriptor storage device 65 a descriptor defining a beginning address and an ending address specified in the extracted specific information, as the transfer source beginning address and the transfer source end address, respectively (step A102). Subsequently, the main CPU 41 may determine whether the DMA controller 66 is performing the DMA transfer processing (step A103). When the main CPU 41 determines that the DMA controller 66 is performing the DMA transfer processing (step A103: YES), the transfer processing may end and the process may proceed to the process at step A16.

When the main CPU 41 determines that the DMA controller 66 is not performing the DMA transfer processing (A103: NO), the main CPU 41 may transmit a startup instruction to the DMA controller 66 (step A104). The startup instruction may comprise a descriptor address representing the storage location of the descriptor in the descriptor storage device 65. When the DMA controller 66 receives the startup instruction, the DMA controller 66 may start the DMA transfer processing. When the process at step A104 ends, the transfer processing may end and the process may proceed to the process at step A16.

Referring to FIG. 8B, when the main CPU 41 determines that the driving data related information is not stored in the specific information storage device 44 (step A13: NO), the main CPU 41 may transmit the specific information transmission request to the second controller 160, via the image processing I/F 32 (step A110). The specific information transmission request may comprise a request for the second controller 160 to transmit the driving data related information. The pieces (e.g., all pieces or a portion thereof) of the driving data related information stored in the driving data storage device 63 may be transmitted collectively from the second controller 160 to the first controller 140. Subsequently, the processing may proceed to step A18.

Further processes performed by the main CPU 41 may be described with reference to FIG. 9B. When the main CPU 41 determines that the image processing I/F 32 has not received the processing end information at step A19 (step A19: NO), the main CPU 41 may determine whether the touch panel 30 has received an input requesting the touch panel 30 to display a list of the print jobs for reprinting (step A50), as shown in FIG. 9B. When the main CPU 41 determines that the touch panel 30 has received the input (step A50: YES), the main CPU 41 may transmit to the second controller 160 the reprint specific information transmission request, which may comprise the request for the second controller 160 to transmit the reprint driving data related information, via the image processing I/F 32 (step A51). The pieces (e.g., all pieces or a portion thereof) of the reprint driving data related information stored in the storage device 67 may be transmitted collectively from the second controller 160 to the first controller 140.

Subsequently, the main CPU 41 may determine whether the image processing I/F 32 has received the reprint driving data related information (step A52). When the main CPU 41 determines that the image processing I/F 32 has not received the reprint driving data related information (step A52: NO), the process at step A52 may be repeated until the image processing I/F 32 has received the reprint driving data related information. When the main CPU 41 determines that image processing I/F 32 has received the reprint driving data related information (step A52: YES), the main CPU 41 may store the reprint driving data related information in the reprint specific information storage device 46 (step A53). Subsequently, the main CPU 41 may extract the print job name comprised in the reprint driving data related information stored in the reprint specific information storage device 46. The main CPU 41 may display a list of one or more extracted print job names in the touch panel 30 (step A54).

Subsequently, the main CPU 41 may determine whether the touch panel 30 has received an input to select a name of the print job to be reprinted (step A55). When the main CPU 41 determines that the touch panel 30 has not received the input to select a name of the print job to be reprinted (step A55: NO), processing may return to step A1. When the main CPU 41 determines that the touch panel 30 has received the input to select a name of the print job to be reprinted (step A55: YES), the main CPU 41 may transfer the reprint driving data related information, which may comprise the selected print job name from among one or more pieces of the reprint driving data related information stored in the reprint specific information storage device 46, to the specific information storage device 44. The transferred reprint driving data related information may be stored in the specific information storage device 44 as the driving data related information (step A56). In modified configurations, when a print job name is selected, reprint settings (e.g., the print mode and the quality mode) may be input via the touch panel 30.

The main CPU 41 may extract the control data comprising one or more of the quality mode and the total number of pages of the print job from the driving data related information associated with the first image data of the print job that is selected for reprinting. The main CPU 41 may transmit the print instruction comprising the extracted control data to the engine controller 80, via the control I/F 36 (step A57). Subsequently, processing may return to step A1.

At step A50, when the main CPU 41 determines that the touch panel 30 has not received an input (step A50: NO), the main CPU 41 may determine whether the transfer end information is received from the DMA controller 66 (step A58). When the main CPU 41 determines that the transfer end information is not received from the DMA controller 66 (step A58: NO), processing may return to step A1. When the main CPU 41 determines that the transfer end information is received from the DMA controller 66 (step A58: YES), the main CPU 41 may determine whether a descriptor that has not yet been read by the DMA controller 66 is stored in the descriptor storage device 65 (step A59). When the main CPU 41 determines that a descriptor that has not yet been read by the DMA controller 66 is not stored in the descriptor storage device 65 (step A59: NO), processing may return to step A1.

When the main CPU 41 determines that a descriptor that has not yet been read by the DMA controller 66 is stored in the descriptor storage device 65 (step A59: YES), the main CPU 41 may transmit the startup instruction to the DMA controller 66 (step A60). The startup instruction may comprise a descriptor address representing the storage location of the descriptor first stored in the descriptor storage device 65 among the one or more descriptors stored in the descriptor storage device 65. Subsequently, processing may return to step A1.

Figure 10A:
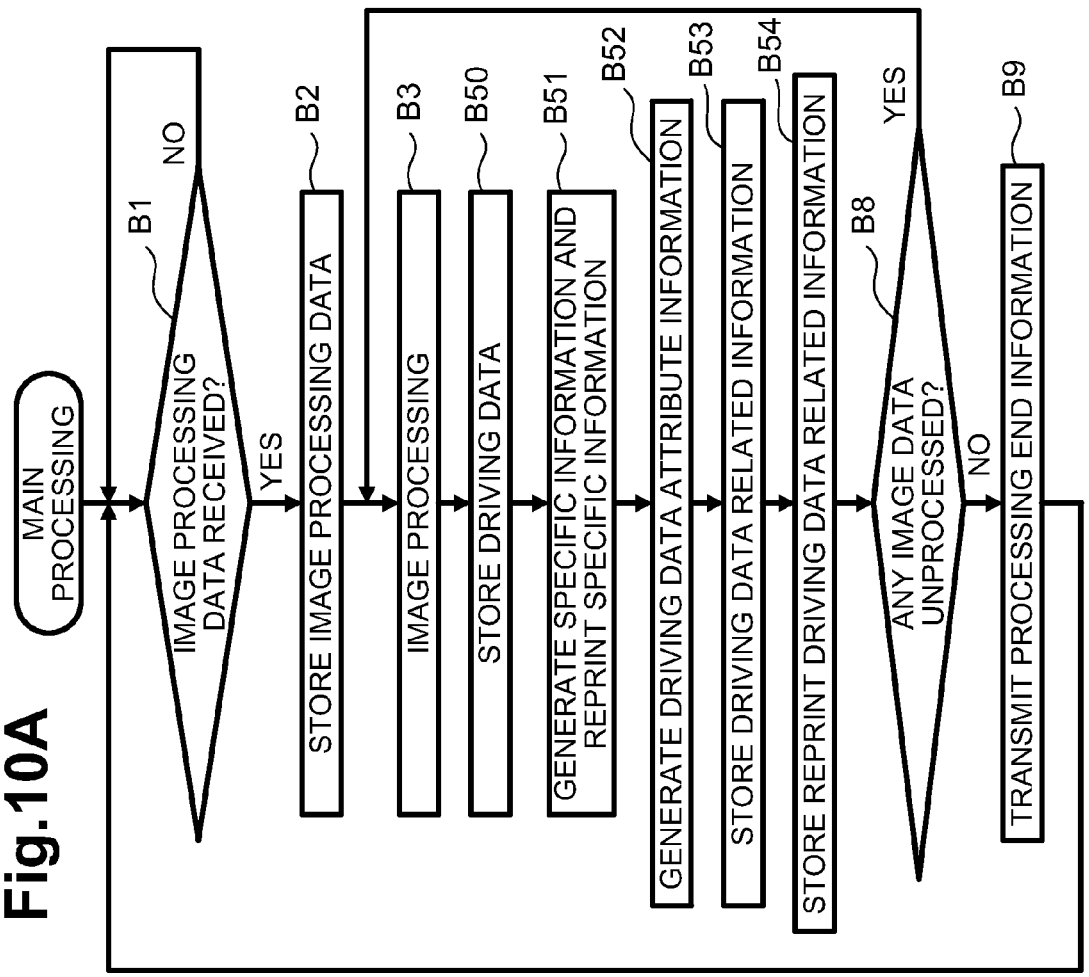
FIG. 10A is a flow sheet that shows a main processing process that may be performed by the second controller of FIG. 7.

The main processing of the second controller 160 now is described with reference to FIG. 10A. The main processing in the second embodiment may comprise steps B50 to B54, rather than the above-described steps B4 to B7.

In step B50, the driving data generated at step B3 may be stored in the driving data storage device 63 and the storage device 67. Accordingly, the driving data storage device 63 and the storage device 67 may store the same driving data therein. Subsequently, the sub CPU 161 may generate the specific information and the reprint specific information (step B51). The specific information may comprise data for specifying the storage location of the driving data stored in the driving data storage device 63 at step B50. The reprint specific information may be data for specifying the storage location of the driving data stored in the storage device 67 at step B50.

The sub CPU 161 may extract the image data attribute information of the image data corresponding to the driving data generated at step B3, from the image processing data stored in the image processing data storage device 62. The sub CPU 161 may generate the driving data attribute information comprising one or more of the extracted image data attribute information and information about the size of the generated driving data (step B52). Subsequently, the sub CPU 161 may store the driving data related information comprising the driving data attribute information and the specific information in the driving data storage device 63 (step B53). The sub CPU 161 may store the reprint driving data related information comprising the driving data attribute information and the reprint specific information in the storage device 67 (step B54). Subsequently, the processing may proceed to step B8.

Figure 10B:
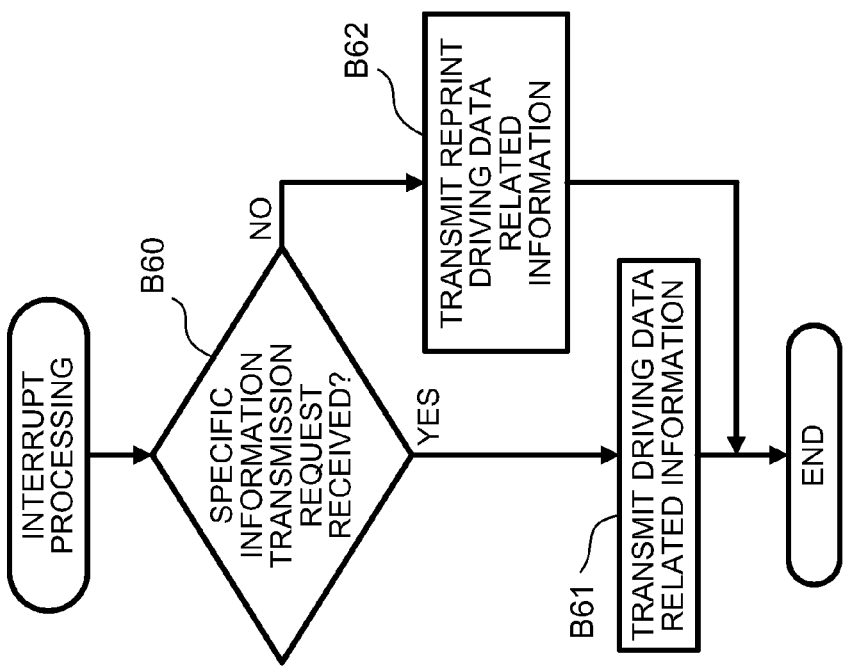
FIG. 10B is a flow sheet that shows an interrupt processing process that may be performed by the second controller of FIG. 7.

The interrupt processing of the second controller 160 now is described with reference to FIG. 10B. The interrupt processing may be performed by interrupting the main processing when a cause of interrupt occurs. As shown in FIG. 10B, when a cause of interrupt comprises the specific information transmission request received by the image processing I/F 34 (step B60: YES), the sub CPU 161 may transmit pieces (e.g., all pieces or a portion thereof) of the driving data related information stored in the driving data storage device 63 to the first controller 140, via the image processing I/F 34 (step B61). Subsequently, the interrupt processing process may end and the process may proceed to the main processing process. When a cause of interrupt comprises the reprint specific information transmission request received by the image processing I/F 34 (step B60: NO), the sub CPU 161 may transmit pieces (e.g., all pieces or a portion thereof) of the reprint driving data related information stored in the storage device 67 to the first controller 140, via the image processing I/F 34 (step B62). Subsequently, the interrupt processing may end and proceed to the main processing.

As described above, the first controller 140 may be configured to store the specific information directly in the descriptor storage device 65 and directly control the DMA controller 66. Thus, the sub CPU 161 may not be involved in the DMA transfer processing, such that loads applied to the second controller 160 by processing other than the image processing may be reduced. Consequently, a component with less data processing capacity may be employed for the second controller 160, which may lead to a cost reduction for the second controller 160.

When the second controller 160 has received the specific information transmission request from the first controller 140, the second controller 160 may be configured to transmit collectively the driving data related information stored in the driving data storage device 63 to the first controller 140. Consequently, the number of communications between the first controller 140 and the second controller 160 may be reduced, such that loads applied to the second controller 160 by processing other than the image processing may be reduced. Thus, a component with less data processing capacity may be employed for the second controller 160, which may lead to a further cost reduction for the second controller 160.

The reprint driving data may be stored in the storage device 67 of the second controller 160. Therefore, image processing may not have to be performed for reprinting. Consequently, loads applied to the inkjet printer 101 when reprinting is performed may be reduced.

While the invention has been described in detail with reference to the specific embodiments thereof, it would be apparent to those skilled in the art that various changes, arrangements and modifications may be applied therein without departing from the spirit and scope of the invention.

For example, in the exemplary embodiments of FIGS. 7A-10B, the second controller 160 may be configured to collectively transmit a plurality of pieces of the driving data related information to the first controller 140. Nevertheless, the second controller 160 may be configured to transmit the driving data related information to the first controller 140 every time the driving data related information is generated, similar to the exemplary embodiments of FIGS. 2A-6. In such a configuration, the second controller 160 may not receive the specific information transmission request from the first controller 140, such that the processing load on the second controller 160 when receiving the specific information transmission request by may be reduced or eliminated. Consequently, the speed of the image processing by the second controller 160 may not be reduced thereby. Alternatively or additionally, in the exemplary embodiments of FIGS. 2A-6, the second controller 60 may be configured to transmit collectively a plurality of pieces of the driving data related information to the first controller 40 in a manner similar to that of the exemplary embodiments of FIGS. 7A-10B.

In the above-described embodiments, computer-readable instructions for the first controller 40, 140; the second controller 60, 160; and the engine controller 80 may be stored in the nonvolatile storage device 43, the nonvolatile storage device 64, and the nonvolatile storage device 83, respectively. Nevertheless, the computer-readable instructions for each controller 40 or 140, 60 or 160, and 80 may be stored in one nonvolatile storage device. Moreover, in other configurations, the computer-readable instructions for each controller 40 or 140, 60 or 160, and 80 may be stored in one or more volatile storage devices, such as, for example, RAM.

In the above-described embodiments, the DMA controller 66 of the second controller 60, 160 may be configured to transfer one piece of the driving data for one DMA transfer processing. Nevertheless, a plurality of pieces of the driving data may be transferred for one DMA transfer processing. Accordingly, the driving data transmission request transmitted from the engine controller 80 to the first controller 40, 140 may comprise information about the size of available space in the engine memory 82. The first controller 40, 140 may be configured to determine the number of pieces of the driving data to be transferred at one DMA transfer processing, based on the information about the size of available space in the engine memory 82.

In the above-described embodiments, the second controller 60, 160 may comprise a general-purpose operating system (e.g., versatile operating system, such as a Windows® computer operating system or a LINUX® computer operating system). Nevertheless, the second controller 60, 160 may comprise a real-time operating system (e.g., μITRON™ computer programs. VxWorks® computer programs, QNX® computer operating systems software).

In the above-described embodiments, the main CPU 41 may be configured to determine the transfer driving data related information after the driving data transmission request is received from the engine controller 80. Nevertheless, the main CPU 41 may be configured to determine the transfer driving data related information before the driving data transmission request is received from the engine controller 80.

In some configurations of the above-described embodiments, one piece of the image processing data may comprise all pieces of the image data comprised in a print job. Nevertheless, one piece of the image processing data may comprise a portion of the image data comprised in a print job. Accordingly, the image data comprised in a print job may be divided into a plurality of pieces of the image processing data. The pieces of the image processing data may be transmitted from the first controller 40, 140 to the second controller 60, 160.

In the above-described embodiments, the address information comprised in the specific information may comprise the beginning address and the ending address of the storage location of the driving data stored in the driving data storage device 63. Nevertheless, the address information may comprise the beginning address and the size of the driving data. When the sizes of the pieces of the driving data stored in the driving data storage device 63 are the same, the address information may comprise the beginning address of the storage location of the driving data, without information about the size of each piece of driving data and the ending address. Accordingly, the address information may be stored as a descriptor in the descriptor storage device 65 and the driving data to be transferred by the DMA controller 66 may be transmitted from the second controller 60, 160 to the engine controller 80.

In the above-described embodiments, a piece of the image data may correspond to data about one page of the sheet P in a print job. Nevertheless, a piece of the image data may correspond to all image data (e.g., all pages) comprised in a print job. In other words, one piece of the driving data may be generated for one print job. In this case, the second controller 60, 160 may store the driving data in the driving data storage device 63 as a file. The second controller 60, 160 may generate path information of the file as the specific information. One piece of the image data may correspond to data comprised in one page of the sheet P in a print job (e.g., character data for one line or data of an image among a plurality of images comprised in one page).

In the above-described embodiments, the network I/F 31 may be connected to the external terminal device 25 via LAN. Nevertheless, other connections may be employed and the network I/F 31 may be connected to the external terminal device 25 via, for example, one or more of wireless communication and wired communication.

In the above-described embodiments, the driving data may be multi-valued data. Nevertheless, the driving data may be data to control driving of the inkjet print head 1 or a laser recording device. Further, the driving data may be so-called rasterized data prior to multi-value processing. When data input from an external device is converted into data corresponding to a recording device, any format or type of data may be employed.

In the above-described embodiments, the first controller 40, 140 may be configured not to transmit the image processing data to the second controller 60, 160 during the image processing by the second controller 60, 160. Nevertheless, the first controller 40, 140 may be configured to transmit the image processing data during the image processing. Accordingly, the second controller 60, 160 may be configured to store the received image processing data in a storage device (e.g., the image processing data storage device 62). When the image processing of the previously received image processing data is finished, the image processing of the image processing data stored in the storage device may be performed.

The second controller 160 may be configured to transmit the driving data related information and the reprint driving data related information to the first controller 140 at different timing. Nevertheless, the second controller 160 may be configured to transmit the driving data related information and the reprint driving data related information to the first controller 140 at the same timing.

In the above-described embodiments, the processing may be performed by one or more of a one or more CPUs, one or more application specific integrated circuits ("ASICs"), or by a combination of one or more CPUs and one or more ASICs.

In particular configurations, the invention may be applied to image recording apparatuses configured to eject other liquid or fluid than ink. Further, in certain configurations, the invention may be applied to other image recording apparatuses, e.g., laser printers, facsimile machines, and copiers.

While the invention has been described in connection with various exemplary structures and illustrative embodiments, it will be understood by those skilled in the art that other variations and modifications of the structures, configurations, and embodiments described above may be made without departing from the scope of the invention. For example, this application comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. An image recording apparatus comprising:
a first controller configured to receive image data, wherein the first controller comprises a first memory;
a second controller configured to communicate with the first controller, wherein the second controller comprises a second memory; and
a recording device configured to communicate with the first controller and the second controller, wherein the recording device is further configured to record on a recording medium an image defined by the image data,
wherein the first controller is further configured to transmit the image data to the second controller,
wherein the second controller is configured to:
receive the image data transmitted by the first controller,
generate driving data comprising instructions for the recording device to record the image defined by the image data,
store the driving data in the second memory,
generate specific information specifying a storage location of the driving data stored in the second memory, and
transmit the specific information to the first controller,
wherein the recording device is configured to transmit a driving data transmission request to the first controller, wherein the driving data transmission request comprises a request for the second controller to transmit the driving data to the recording device,
wherein the first controller is configured to:
receive the specific information transmitted by the second controller,
store the specific information in the first memory,
generate a driving data transmission instruction based on the specific information stored in the first memory when the first controller receives the driving data transmission request, wherein the driving data transmission instruction comprises an instruction for the second controller to transmit the driving data, which is specified by the specific information and is stored in the second memory, to the recording device, and
transmit the driving data transmission instruction to the second controller, and
wherein the second controller is configured to:
receive the driving data transmission instruction transmitted by the first controller;
transmit the driving data, which is stored in the second memory and is specified by the driving data transmission instruction received from the first controller, to the recording device.

2. The image recording apparatus according to claim 1, wherein the specific information comprises address information specifying the storage location of the driving data stored in the second memory,
wherein the second controller further comprises:
a third memory configured to store the address information; and
a transmitting device configured to transmit the driving data, which is stored in the storage location specified by the address information, based on the address information stored in the third memory,
wherein the first controller is configured to transmit the address information as the driving data transmission instruction to the second controller, and
wherein the second controller is configured to receive the address information transmitted by the first controller and configured to store the address information in the third memory.

3. The image recording apparatus according to claim 1, wherein the recording device is configured to communicate with the second controller via a one-way communication, and
wherein the one-way communication consists of receiving data from the second controller.

4. The image recording apparatus according to claim 1, wherein the second controller is configured to:
generate a new piece of the specific information each time the first controller receives a new piece of the image data when the first controller receives a plurality of pieces of the image data; and
transmit the new piece of the specific information to the first controller each time the second controller generates the new piece of the specific information.

5. The image recording apparatus according to claim 1, wherein the second controller is configured to:
generate a new piece of the specific information each time the first controller receives a new piece of the image data when the first controller receives a plurality of pieces of the image data, and
store the new piece of the specific information in the second memory each time the second controller generates the new piece of the specific information, such that a plurality of pieces of the specific information are stored in the second memory, wherein the first controller is configured to transmit a specific information transmission request to the second controller, wherein the specific information transmission request comprises a request to transmit the specific information stored in the second memory to the first controller, and wherein the second controller is configured to transmit collectively to the first controller the plurality of pieces of the specific information stored in the second memory when the second controller receives the specific information transmission request transmitted by the first controller.

6. The image recording apparatus according to claim 1, wherein the first controller comprises a real-time operating system, and wherein the second controller comprises a versatile operating system.

7. The image recording apparatus according to claim 1, wherein the first controller comprises a first processor, wherein the second controller comprises a second processor, and wherein a processing speed of the second processor is greater than a processing speed of the first processor.

8. An image recording apparatus comprising:
a first controller configured to receive image data, wherein the first controller comprises a first memory;
a second controller configured to communicate with the first controller, wherein the second controller comprises a second memory;
a recording device configured to communicate with the first controller, wherein the recording device is further configured to record on a recording medium an image defined by the image data;
a third memory configured to communicate with the first controller, wherein the third memory is further configured to store specific information specifying a storage location of particular data stored in the second memory; and
a data transmitting device configured to communicate with the recording device, the second memory, and the third memory, wherein the data transmitting device is further configured to transmit the particular data based on the specific information stored in the third memory, and wherein the particular data is stored in the storage location specified by the specific information,
wherein the first controller is further configured to transmit the image data to the second controller,
wherein the second controller is configured to:
receive the image data transmitted by the first controller,
generate driving data comprising instructions for the recording device to record the image defined by the image data,
store the driving data in the second memory,
generate the specific information specifying a storage location of the driving data stored in the second memory, and
transmit the specific information to the first controller,
wherein the first controller is configured to receive the specific information transmitted by the second controller and store the specific information in the first memory,
wherein the recording device is configured to transmit a driving data transmission request to the first controller, wherein the driving data transmission request comprises a request for the second controller to transmit the driving data to the recording device, wherein the first controller is configured to store the specific information in the third memory when the first controller receives the driving data transmission request transmitted by the recording device, and wherein the transmitting device is configured to transmit the driving data, which is stored in the second memory and is specified by the specific information stored in the third memory, to the recording device.

9. The image recording apparatus according to claim 8, wherein the second controller comprises the transmitting device and the third memory.

10. A method for performing image recording on an image recording apparatus comprising a first controller configured to receive image data, wherein the first controller comprises a first memory, a second controller configured to communicate with the first controller, wherein the second controller comprises a second memory, and a recording device configured to communicate with the first controller and the second controller, wherein the recording device is further configured to record on a recording medium an image defined by the image data, the method comprising the steps of:
transmitting the image data from the first controller to the second controller;
generating at the second controller driving data comprising instructions for the recording device to record the image defined by the image data;
storing the driving data in the second memory,
generating at the second controller specific information specifying a storage location of the driving data stored in the second memory;
transmitting the specific information from the second controller to the first controller;
storing the specific information in the first memory;
transmitting a driving data transmission request from the recording device to the first controller, wherein the driving data transmission request comprises a request for the second controller to transmit the driving data from the second controller to the recording device;
generating a driving data transmission instruction based on the specific information stored in the first memory when the first controller receives the driving data transmission request, wherein the driving data transmission instruction comprises an instruction for the second controller to transmit the driving data, which is specified by the specific information and stored in the second memory, to the recording device;
transmitting the driving data transmission instruction from the first controller to the second controller;
transmitting the driving data, which is stored in the second memory and is specified by the driving data transmission instruction received from the first controller, from the second controller to the recording device.

11. A non-transitory, computer-readable storage medium storing computer-readable instructions therein that, when executed by at least one processor of an image recording apparatus comprising a first controller configured to receive image data, wherein the first controller comprises a first memory, a second controller configured to communicate with the first controller, wherein the second controller comprises a second memory, and a recording device configured to communicate with the first controller and the second controller, wherein the recording device is further configured to record on a recording medium an image defined by the image data, instruct the image forming apparatus to execute the steps of:

transmitting the image data from the first controller to the second controller;
generating at the second controller driving data comprising instructions for the recording device to record the image defined by the image data;
storing the driving data in the second memory,
generating at the second controller specific information specifying a storage location of the driving data stored in the second memory;
transmitting the specific information from the second controller to the first controller;
storing the specific information in the first memory;
transmitting a driving data transmission request from the recording device to the first controller, wherein the driving data transmission request comprises a request for the second controller to transmit the driving data from the second controller to the recording device;
generating a driving data transmission instruction based on the specific information stored in the first memory when the first controller receives the driving data transmission request, wherein the driving data transmission instruction comprises an instruction for the second controller to transmit the driving data, which is specified by the specific information and stored in the second memory, to the recording device;
transmitting the driving data transmission instruction from the first controller to the second controller;
transmitting the driving data, which is stored in the second memory and is specified by the driving data transmission instruction received from the first controller, from the second controller to the recording device.

* * * * *